US008594028B2

(12) United States Patent
Mark

(10) Patent No.: US 8,594,028 B2
(45) Date of Patent: Nov. 26, 2013

(54) COGNITIVE CHANNEL ASSIGNMENT IN WIRELESS NETWORKS

(75) Inventor: Brian L. Mark, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 1031 days.

(21) Appl. No.: 12/475,966

(22) Filed: Jun. 1, 2009

(65) Prior Publication Data

US 2010/0142458 A1 Jun. 10, 2010

Related U.S. Application Data

(60) Provisional application No. 61/057,628, filed on May 30, 2008.

(51) Int. Cl.
*H04W 4/00* (2009.01)
(52) U.S. Cl.
USPC ............ 370/329; 370/341; 370/437; 455/450
(58) Field of Classification Search
None
See application file for complete search history.

(56) References Cited

U.S. PATENT DOCUMENTS

| | | | | |
|---|---|---|---|---|
| 5,946,346 A * | 8/1999 | Ahmed et al. | ................. | 375/219 |
| 7,768,973 B2 * | 8/2010 | Zhu et al. | ...................... | 370/329 |
| 2007/0178930 A1 * | 8/2007 | Xiao et al. | ..................... | 455/522 |
| 2007/0248178 A1 * | 10/2007 | Zhu et al. | ...................... | 375/260 |
| 2007/0258540 A1 * | 11/2007 | Ratasuk et al. | ............... | 375/267 |
| 2009/0103488 A1 * | 4/2009 | Zhu et al. | ...................... | 370/330 |
| 2009/0227249 A1 * | 9/2009 | Ylitalo | ........................... | 455/424 |
| 2009/0245195 A1 * | 10/2009 | Bhattad et al. | ................ | 370/329 |
| 2010/0093386 A1 * | 4/2010 | Damnjanovic et al. | ....... | 455/522 |
| 2010/0317385 A1 * | 12/2010 | Kazmi et al. | ................... | 455/501 |
| 2011/0003605 A1 * | 1/2011 | Song et al. | ..................... | 455/501 |
| 2011/0075594 A1 * | 3/2011 | Burstrom et al. | ............. | 370/280 |

\* cited by examiner

*Primary Examiner* — Hassan Kizou
*Assistant Examiner* — Roberta A Shand
(74) *Attorney, Agent, or Firm* — DLA Piper LLP (US)

(57) ABSTRACT

An apparatus and method for assigning subchannel(s) for communication between frequency agile mobile station(s) and a frequency agile base station. A received power level may be identified for each subcarrier in a set of subcarriers available for data transmission. A minimum power level needed to establish communications may be allocated. A detection threshold set to avoid interference with other devices currently transmitting on the set of subcarriers may be determined using the minimum uplink power level. A subset of subcarriers not already assigned may be selected where each subcarrier in the subset of subcarriers has a received power level that is less than the detection threshold. A subchannel that satisfies a bandwidth requirement may be formed where the subchannel consists of selected subcarriers in the set of subcarriers available for data transmission between the frequency agile mobile station(s) and the frequency agile base station.

20 Claims, 25 Drawing Sheets

COGNITIVE CHANNEL ASSIGNMENT IN WIRELESS NETWORKS

CROSS-REFERENCE TO RELATED APPLICATIONS

This application claims the benefit of U.S. Provisional Application No. 61/057,628, filed May, 30, 2008, entitled "Method and System for Cognitive Channel Assignment in Wireless Networks," which is hereby incorporated by reference in its entirety.

STATEMENT REGARDING FEDERALLY SPONSORED RESEARCH OR DEVELOPMENT

This invention was made with government support under Contract No. CNS-0520151 awarded by the U.S. National Science Foundation. The Government may have certain rights in this invention.

BACKGROUND

During the past decade, broadband wireline and wireless mobile services have been two of the most remarkable growth areas in the telecommunications industry. Broadband access has been enabled by technologies such as Digital subscriber line (DSL), cable modems, and fiber-to-the-home (FTTH). Wireless mobile access has been driven by 2G and now 3G cellular systems. In addition to cellular systems, Wi-Fi systems based on the IEEE 802.11 family of standards, have become enormously popular for providing in-building wireless coverage. Wi-Fi systems offer much higher peak data rates than 3G systems, but are not designed to support high-speed mobility.

Worldwide Interoperability for Microwave Access (WiMAX) is an emerging technology based on the IEEE 802.16 family of standards for broadband wireless mobile access that provides a rich set of features and a high degree of flexibility. As used herein, the term "WiMAX" refers to "mobile WiMAX," i.e., the WiMAX standard that accommodates mobile subscribers. Unlike 3G systems, which provide only a fixed channel bandwidth, WiMAX allows the user to select an adjustable channel bandwidth from 1.25 MHz to 20 MHz. By using Orthogonal Frequency Division Multiplexing (OFDM) as the primary modulation scheme, WiMAX, as well as Wi-Fi, is able to support much higher peak data rates than 3G systems that are based on Code Division Multiple Access (CDMA), which requires bandwidth spreading. OFDM is a multicarrier modulation scheme whereby a given high-rate data stream is divided into several parallel low bit-rate streams, each of which is modulated onto a separate carrier called a subcarrier or tone. The multiple access scheme adopted by WiMAX is Orthogonal Frequency Division Multiple Access (OFDMA), whereby the available subcarriers are further divided into groups called subchannels, which can be allocated to different users. In OFDMA, the subcarriers assigned to a subchannel need not be contiguous, allowing for a flexible assignment of data rates to users.

In recent years, dynamic spectrum access (DSA) has been an active area of research because of its potential to exploit highly underutilized wireless spectrum. Cognitive radios with frequency agility enable DSA by sensing spectrum "holes" and automatically tuning to available frequency channels. Much of the research on DSA has focused on systems consisting of secondary users equipped with cognitive radios that attempt to utilize spectrum that is not being used by the primary licensed users at a particular time and place.

WiMAX and Cellular Systems

The WiMAX Forum is promoting broadband wireless technology based on the IEEE 802.16 family of standards. The original 802.16 standard for fixed wireless access was completed in 2001 based on a single-carrier physical (PHY) layer with a medium access control (MAC) layer based on TDMA (time division multiple access). Subsequently, 802.16a was developed, based on orthogonal frequency division multiplexing (OFDM) and orthogonal frequency division multiple access (OFDMA). Further revisions resulted in a new standard released in 2004 called IEEE 802.16-2004 (IEEE, "Standard 802.16-2004. Part 16: Air interface for fixed broadband wireless access systems" (October 2004)), which replaced all prior versions of 802.16. This standard formed the basis of the first WiMAX standard, referred to as fixed WiMAX. In 2005, a new standard called 802.16e-2005 (IEEE, "Standard 802.16e-2005. Amendment to IEEE Standard for Local and Metropolitan Area Networks—Part 16: Air Interface for Fixed Broadband Wireless Access Systems-Physical and Medium Access Control Layers for Combined Fixed and Mobile Operation in Licensed Bands," (December 2005)) was completed, which included mobility support. This standard forms the basis for mobile WiMAX technology. Although the examples and configurations described herein assume the use of mobile WiMAX, as used herein the term WiMAX refers to both fixed and mobile WiMAX.

A. WiMAX Physical Layer

The WiMAX PHY specifies several operational frequency bands, including 2-11 GHz for fixed applications. An earlier version of the 802.16 standard specified a frequency band of 10-60 GHz for fixed applications. The PHY layer is based on OFDM, a multicarrier modulation scheme which provides strong mitigation of multipath effects and allows for operation in non-line-of-sight (NLOS) conditions. In OFDM, a high bit-rate stream is divided into several parallel low bit-rate substreams, each of which is modulated onto a separate subcarrier or tone. The substream symbol time is chosen to be large enough so that the delay spread incurred by the wireless channel is a small fraction of the symbol duration, thus minimizing intersymbol interference (ISI). The subcarriers are chosen to be mutually orthogonal over the symbol period, such that the subcarrier channels need not be nonoverlapping.

An OFDM signal can be generated by taking the inverse Discrete Fourier Transform (IDFT) of the input data stream in blocks of L symbols, where L is the number of subcarriers. OFDM transmitters and receivers can be implemented with low complexity using the Fast Fourier Transform (FFT). Besides ISI-mitigation and low computational complexity, OFDM provides frequency diversity by allowing coding/interleaving across subcarriers and robustness against narrowband interference.

The multiple access technique used in WiMAX is called scalable OFDMA because the FFT size used in OFDM can be scaled from 128 to 2048. As the available spectrum bandwidth increases, the FFT size for OFDM can be increased to maintain a constant subcarrier spacing. Typically, the subcarrier spacing is 10.94 kHz. Thus, when the channel bandwidth is 1.25, 5, 10, and 20 MHz, the FFT size is set to 128, 512, 1024, and 2048, respectively, to maintain the 10.94 kHz subcarrier spacing.

In OFDMA, the available subcarriers are further partitioned into groups of subcarriers called subchannels. Different subchannels are assigned to different users. By assigning different numbers of subcarriers to subchannels, fine-grained resource allocation may be achieved. The subcarriers making up a subchannel need not be contiguous. Subchannels consisting of noncontiguous subcarriers offer greater frequency diversity. WiMAX defines several different subchannelization schemes for both the uplink and downlink.

OFDMA may be considered a hybrid of TDMA (Time Division Multiple Access) and FDMA (Frequency Division Multiple Access), in the sense that users are allocated both OFDM subcarriers and time slots. OFDMA offers the multipath suppression and frequency diversity of OFDM plus flexible allocation of rates to users. In the time domain, data may be transmitted in the form of frames. The minimum time-frequency unit that can be allocated to a user is a slot. A slot consists of a subchannel over one, two, or three OFDM symbols, depending on the subchannelization scheme that is used. A contiguous set of slots assigned to a user is called a data region.

WiMAX supports both TDD (Time Division Duplexing) and FDD (Frequency Division Duplexing). FIGS. 1-2 shows sample WiMAX OFDMA frame structures for FDD and TDD. FIG. 1 shows a sample WiMAX FDD frame structure consisting of 6 data regions on the downlink and uplink, respectively. Similarly, FIG. 2 shows a WiMAX TDD frame structure with 6 data regions. In both cases, the uplink and downlink media access protocol (MAP) messages (UL-MAP and DL-MAP) specify the allocation of users to data regions within the frame. The ranging channel in the uplink portion of the WiMAX frame provides contention-based access for frequency, time, and power adjustments. The ranging channels can also be used by a mobile station (MS) to make uplink bandwidth requests. As used herein, the term subscriber station (SS) is equivalent to mobile station. Best-effort traffic may also be transmitted on the ranging channel when the amount of data to be sent is relatively small. The frame size can be varied on a frame-by-frame basis from 2 to 20 ms, but the nominal frame size is 5 ms. With an OFDM symbol duration of 102.9 μs, the number of OFDM symbols in a 5 ms frame is 48. In general, TDD allows for simpler and flexible sharing of bandwidth between uplink and downlink. On the other hand, TDD requires synchronization across multiple base stations.

B. WiMAX MAC Layer.

The WiMAX MAC layer takes packets from the upper layer, called MAC service data units (MSDUs) and transforms them into MAC protocol data units (MPDUs) for transmission over the PHY layer. The MAC layer includes a convergence sublayer that can provide an interface to various high layer protocols, but currently only IP and Ethernet are supported. In WiMAX, the base station is responsible for allocating bandwidth to all users on the uplink and downlink. On the downlink, the BS may allocate bandwidth to each MS according to the requirements of the incoming traffic without involving the MS. On the uplink, the MS may make requests for uplink bandwidth via a polling mechanism overseen by the BS.

The WiMAX MAC layer is connection-oriented in the sense that prior to data transmission, a logical link called a connection must be established between the BS and the MS. The connection is assigned a connection identifier (CID). The connection-oriented architecture allows WiMAX to support fine-grained Quality-of-Service (QoS). A service flow may be a unidirectional flow of packets associated with a set of QoS parameters and identified by a service flow identifier (SFID). The QoS parameters may include priority, maximum sustained traffic rate, minimum tolerable rate, maximum delay, etc.

WiMAX specifies five scheduling services summarized below:

1) Unsolicited grant services (UGS): This service supports constant bit rate (CBR) traffic with fixed-size data packets.
2) Real-time polling services (rtPS): This service supports real-time variable bit rate (VBR) traffic flows that generate variable-size data packets on a periodic basis.
3) Non-real-time polling services (nrtPS): This service supports delay-tolerant flows that require a minimum guaranteed traffic rate.
4) Best-effort service (BE): This service supports data streams that do not require minimum QoS guarantees.
5) Extended real-time variable rate (ERT-VR) service: This service supports real-time traffic flows that require a guaranteed data rate and delay.

While WiMAX provides extensive bandwidth allocation and QoS mechanisms, it does not specify or standardize any details of scheduling and management.

C. Cellular Systems.

WiMAX systems may be deployed as cellular systems in a geographic coverage area partitioned into smaller regions called cells. Each cell may be served by a base station, which limits its transmit power to provide sufficient signal strength at the cell boundary. Propagation path loss allows base stations in spatially separated cells to transmit at the same carrier frequencies without causing harmful interference to each other.

In conventional cellular systems based on FDMA (Frequency Division Multiple Access), the system bandwidth may be divided into frequency channels of equal bandwidth. Each channel provides a communication link for a single connection or call. If frequency-division duplexing (FDD) is used, separate frequency channels may be allocated for the uplink and downlink channels. In time-division duplexing (TDD), a single frequency channel supports both the uplink and downlink channels via time-division multiplexing.

As discussed above, WiMAX is based on OFDMA, which allows an allocation of spectrum to users to accommodate different traffic types and data rate requirements. In OFDMA, subcarriers are grouped into subchannels which are allocated to users. From the user's perspective, an OFDMA subchannel corresponds to a frequency channel in conventional FDMA-based cellular systems, except that the bandwidth of an OFDMA subchannel can be variable. To avoid co-channel interference in OFDMA, however, the subcarrier may be the basic unit of frequency allocation.

Frequency allocation in cellular systems may be described in terms of frequency channels in conventional FDMA-based cellular systems with the understanding that for WiMAX, frequency allocation would be performed at the granularity of a subcarrier.

The mechanism used to assign frequency channels within a cell in an FDMA cellular system is referred to as a channel assignment scheme. Two channel assignment schemes that have been used in conventional cellular networks are fixed channel assignment (FCA) and dynamic channel assignment (DCA).

1) Fixed Channel Assignment (FCA): In FCA, the coverage area is partitioned into groups of contiguous cells called clusters. The set of frequency channels may be partitioned evenly among the cells in any given cluster such that each cell in the network is allocated a predetermined set of channels. Any call request within the cell can only be served by the unused channels assigned to that particular cell.

To improve utilization, a borrowing option may be considered. With the borrowing option, a cell is allowed to borrow channels from a neighboring cell if all of its own channels are already occupied and the neighboring cell has spare channels. Borrowing is normally supervised by the mobile switching center (MSC). Since handoff is performed by the MSC, the MSC has full knowledge of the capacity usage of the cluster of cells within its jurisdiction. Therefore, the MSC is a subsystem that can oversee functions such as channel borrowing.

2) Dynamic Channel Assignment (DCA): In DCA, channels are not allocated to cells on a permanent basis. Each time a call request is made, the serving base station requests a channel from the MSC. The MSC dynamically determines the availability of a channel and executes its allocation procedure accordingly. The MSC generally only allocates a given frequency channel if that channel is not presently in use in the cell, or any other cell which falls within the minimum restricted distance of frequency reuse to avoid co-channel interference.

The DCA scheme may be explained in terms of the cell cluster concept. For a given cell i, an associated MSC maintains a list of channels with an indication of whether the channel is free or occupied. When a call request arrives to cell i, the call is assigned a free channel, say channel c, if one is available. In this case, channel c is marked as "occupied" for all of the other cells in the cell cluster centered at cell i. Later, when the call completes, channel c is marked as "free" for all cells in the cluster centered at cell i.

DCA may reduce the likelihood of call blocking, which increases the trunking capacity of the system, since all available channels under control of the MSC are accessible to all of the cells. However, DCA schemes require the MSC to collect real-time data on channel occupancy, traffic distribution, and radio signal quality of all channels on a continuous basis. The MSC may need to do this data collection in order to manage handoffs between cells.

BRIEF DESCRIPTION OF THE SEVERAL VIEWS OF THE DRAWINGS

The accompanying drawings, which are included to provide a further understanding of the invention, are incorporated in and constitute a part of this specification; illustrate embodiments of the invention and together with the detailed description serve to explain the principles of the invention. No attempt is made to show structural details of the invention in more detail than may be necessary for a fundamental understanding of the invention and various ways in which it may be practiced.

DETAILED DESCRIPTION OF EMBODIMENTS

Figure 1:
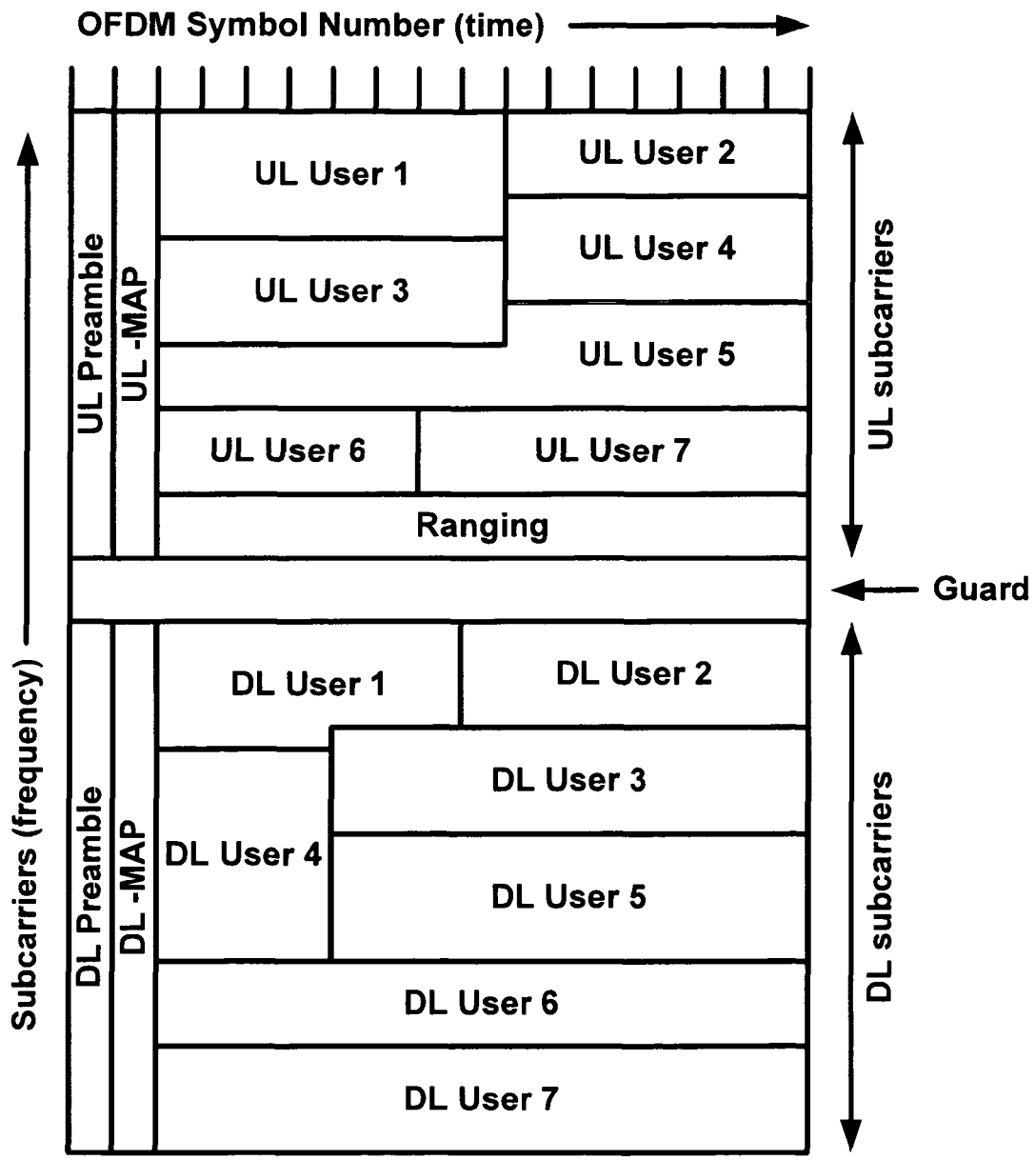
FIG. 1 shows a sample WiMAX FDD frame structure having 6 data regions on the downlink and uplink, respectively.

Embodiments of the present invention generally relates to cognitive radio and methods for assigning communication channels in a cellular network having cognitive radio transceivers.

As used herein, a cognitive radio-enabled WiMAX system is referred to as a cognitive WiMAX system. In a cognitive WiMAX system, base stations may be equipped with cognitive radios (CRs) that sense the spectrum availability and dynamically assign channel resources among the CR nodes. Examples of embodiments of the present invention are described for cognitive WiMAX based on a cognitive channel assignment (CCA) scheme. Achievable capacity improvements over conventional WiMAX system architectures are also disclosed.

Embodiments of the invention provide a framework for applying frequency agile cognitive radio technology to networks such as WiMAX networks. In an embodiment, cognitive WiMAX architecture involves equipping the base stations with frequency agile cognitive radios with sensitive signal detectors. The base stations may employ a cognitive channel assignment (CCA) scheme to allocate subcarriers. The CCA scheme may combine power control, spectrum sensing, and Listen-Before-Talk dynamic spectrum access to achieve a substantial gain in frequency reuse relative to the conventional Fixed Channel Assignment (FCA) and Dynamic Channel Assignment (DCA) schemes.

As shown and described herein, embodiments of the invention using a CCA scheme have been shown in computer simulations to achieve 30-300% higher capacity compared to a conventional DCA scheme. In an embodiment, the use of CCA may simplify network operations with respect to DCA by employing cognitive radio technology in the base stations. The cognitive radio techniques discussed in this disclosure may be applied to a multitude of cellular systems that utilize technologies such as WiMAX, LTE, OFDMA and FDMA.

Frequency-Agile Cognitive Radio Technology

A frequency-agile cognitive radio (CR) is preferably capable of sensing the spectrum and dynamically tuning to frequency channels determined to be available. Frameworks have been developed to evaluate the performance of dynamic spectrum access (DSA) schemes. As used herein, a CR node may be presumed to employ or be capable of using Listen-Before-Talk (LBT) dynamic spectrum access. It may be possible to achieve more substantial spectrum gains by using schemes in which CR nodes collaborate with each other to perform dynamic spectrum access, at the expense of higher communication and computational complexity.

A. Listen-Before-Talk Spectrum Access

The Listen-Before-Talk (LBT) protocol is a scheme for a CR node to access a radio frequency channel dynamically. The LBT scheme consists of two states: (1) listen or "off" state 310; and (2) the talk or "on" state 320. During the off state 310, CR node does not transmit a signal and estimates the received signal power R in the radio channel c. In the off state 310, the CR node may also estimates a transmit power level, s*, which is referred to herein as the maximum interference-free transmit power (MIFTP).

Figure 3:
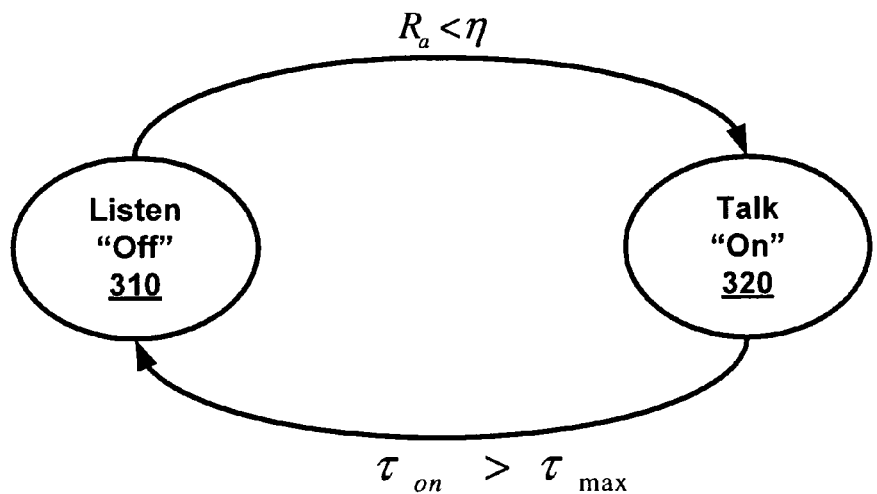
FIG. 3 shows an example state transition diagram for an LBT protocol.

The MIFTP is defined as the maximum power at which the CR node can transmit without causing harmful interference to any of the primary nodes. Primary nodes also may be described herein as victim or non-cooperative nodes. During the off state 310, the CR node listens to the channel and transitions to the on state 320 if $R<\eta$. Otherwise, the CR node remains in the off state 310 for the same channel c or switches to a different frequency channel c' that may be available. For simplicity, this disclosure will provide examples of the case where the CR node seeks to use the same channel c. During the on state 320, the CR node transmits at a power level less than or equal to the MIFTP s* for a maximum duration of $t_{max}$, and then returns to the off state 310 to listen again. FIG. 3 illustrates the LBT algorithm by means of a state transition diagram. More sophisticated variations of the LBT scheme can be devised that involve collaboration among a group of CR nodes.

Figure 4:
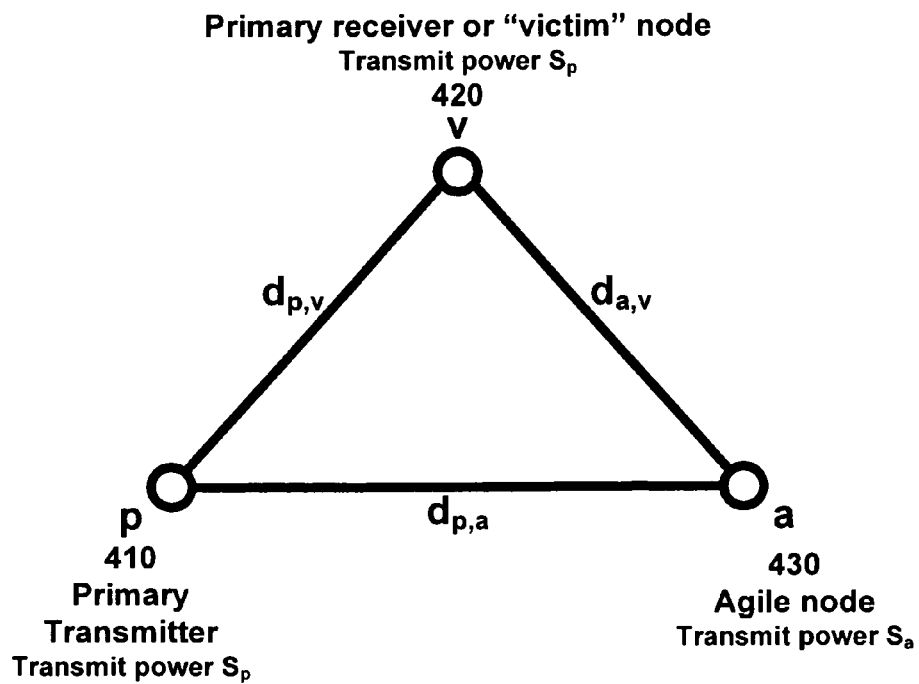
FIG. 4 shows an example network having a primary transmitter, a primary receiver, and an agile node.

An example scenario having three nodes is shown in FIG. 4. The example network includes a primary transmitter p 410, a victim receiver v 420, and a CR node denoted by a 330. Node p 410 transmits on frequency channel c, while node a performs LBT on the channel. The receiver v 420 expects to receive the transmissions of node p 410 and is a potential "victim" node of the CR node a 430 since node a 430 may cause interference to node v 420 while in the on state.

Several quantities of interest with respect to the simple LBT scenario of FIG. 4 may be defined. Assuming that the primary node p 410 transmits with constant power $s_p$, the received power at node v 420 from node p 410 is given by $$R_v \triangleq s_p - L_{p,v}, \quad (1)$$

where $L_{p,v}$ denotes the propagation loss from node p 410 to node v 420. The propagation loss between two nodes i and j can be modeled as a sum of two components:

$$L_{i,j} = D_{i,j} + W_{i,j}, \quad (2)$$

where $D_{i,j}$ denotes the median path loss and $W_{i,j}$ is a random variable representing shadowing noise. The path loss component $D_{i,j}$ depends on the terrain profile between nodes i and j. Examples of path loss models that are relevant to WiMAX deployments (Andrews, J. et al., Fundamentals of WiMAX. Prentice Hall, (2007)) include the Okumura-Hata model, the COST-231 Hata model, the Walfish-Ikegami model, and the Erceg model. These models are suitable for both Line-of-Sight (LOS) and Non-Line-of-Sight (NLOS) scenarios and are based on empirical measurements. The simulation results discussed in the performance analysis described herein assume an Erceg path loss model (Erceg, V. et al., IEEE J. on Selected Areas in Commun., 17:1205-1211, (June 1999)).

The EPM-73 propagation model (Lustgarten, M. N. et al., IEEE Trans. on Electromagnetic Compatibility, vol. 19, (August 1977)) is a representative empirical path loss model in which the path loss depends only on the terrain type and the distance between the nodes, rather than on the detailed terrain profile. Assuming a path loss model similar to EPM-73, the path loss can be expressed as a function of the distance $d_{i,j}$ between nodes i and j, the height $h_i^{(t)}$ of the transmit antenna at node i, the height $h_j^{(r)}$ of the receive transmitter at node j, the carrier frequency $f_c$, and the antenna polarization $o_i$ at node i:

$$D_{i,j} = g(d_{i,j}, h_i^t, h_j^r, f_c, o_i). \quad (3)$$

To simplify the notation, $D_{i,j}$ may be written as $D_{i,j} = g(d_{i,j})$, suppressing the dependence of the path loss on the remaining four parameters. Assuming the function $g(\bullet)$ is invertible, the distance between nodes i and j can be obtained from the path loss $D_{i,j}$ as follows:

$$d_{i,j} = g^{-1}(D_{i,j}). \quad (4)$$

The shadowing noise $W_{i,j}$ is typically modeled as a zero-mean white Gaussian noise process with variance $\sigma_{i,j}^2$ which is independent of the path loss $D_{i,j}$.

The outage probability of node v with respect to the primary node p 410 is the probability that the received signal strength $R_v$ falls below a threshold $r_{min}$:

$$P_{out} = P\{R_v < r_{min} | E_p\} \quad (5)$$

where $E_p$ denotes the event that node p 410 is in the on state 320. The coverage distance of node p 410 is the maximum distance between the node p 410 and any victim node v 420 such that the outage probability does not exceed a value $\epsilon_{out}$:

$$d_{cov,p}(\epsilon_{out}) \triangleq \max\{d_{p,v} : P_{out} \le \epsilon_{out}\}. \quad (6)$$

The outage probability and coverage distance depend on the propagation loss between the primary node p 410 and the victim node v 430. With the assumptions on propagation loss discussed above, the coverage distance can be expressed as:

$$d_{cov,p}(\epsilon_{out}) = g^{-1}(s_p - r_{min} + \alpha_{p,v}), \quad (7)$$

where $$\alpha_{p,v} \triangleq \sigma_{p,v} Q^{-1}(1 - \epsilon_{out}), \quad (8)$$

where $$Q(x) \triangleq \frac{1}{\sqrt{2\pi}} \int_x^\infty e^{-t^2/2} \, dt$$

denotes the standard Q-function. The coverage region associated with the primary node p 410 is the area enclosed by the circle centered at node p 410 with radius $d_{cov,p}$.

Let $R_a$ denote the received power at the CR node a 430 from the primary node p 410. We define the detection probability, $P_{det}$, at the CR node as the probability that the received signal from the primary node p 410 is greater than or equal to a given threshold $\eta_{det}$:

$$P_{det} \triangleq P\{R_a \geq \eta_{det}\}. \tag{9}$$

The detection distance, $d_{det}$, at the CR node a 430 is defined as the maximum distance between the CR node and the primary node such that the probability of detection exceeds a value $\epsilon_{det}$:

$$d_{det}(\epsilon_{det}) \triangleq \max\{d_{a,p}: P_{det} \geq \epsilon_{det}\}. \tag{10}$$

The detection distance can be expressed as follows:

$$d_{det}(\epsilon_{det}) = g^{-1}(s_p - \eta_{det} - \alpha_{p,a}), \tag{11}$$

where $$\alpha_{p,a} \triangleq \sigma_{p,a} Q^{-1}(1 - \epsilon_{det}). \tag{12}$$

The detection region is the area enclosed by the circle centered at node a 430 with radius $d_{det}$.

Let $I_v$ denote the interference power received at the victim node v 420 from the CR node a 430:

$$I_S \triangleq s_a - L_{a,v}. \tag{13}$$

Harmful interference occurs when the signal power received at node v 420 from node a 430 exceeds a threshold $i_{max}$ and the received power $R_v$ exceeds $r_{min}$. Thus, the interference probability, $P_{int}$, is given by $$P_{int} = P\{R_v \geq r_{min}, E_p\} \cdot P\{I_v > i_{max}, E_a\}, \tag{14}$$

where $E_a$ denotes the event that node a 420 is in the on state 320 and we assume independence of $R_v$ and $I_v$.

Let $\epsilon_{int}$ denote the maximum interference probability that can be tolerated by the victim node v 420. The interference distance is defined as the minimum permissible distance between the CR node a 430 and the victim node v 420 such that the interference probability does not exceed $\epsilon_{int}$:

$$d_{int}(\epsilon_{int}) \triangleq \min\{d_{a,v}: P_{int} \leq \epsilon_{int}\}. \tag{15}$$

We define the interference region of the CR node a 430 to be the region enclosed by the circle centered at node a 430 with radius $d_{int}$. The interference distance can be expressed as follows:

$$d_{int} = g^{-1}(s_a - i_{max} - \alpha_{a,v}), \tag{16}$$

where $$\alpha_{a,v} \triangleq \sigma_{a,v} Q^{-1}\left(1 - \epsilon_{int} \frac{1}{(1 - P_{out})(1 - P_{det})}\right). \tag{17}$$

The coverage, detection, and interference distances are key parameters in determining the performance of the LBT spectrum access scheme. If the outage probability and detection probabilities satisfy $$P_{out} \leq \epsilon_{out} \text{ and } P_{det} \leq \epsilon_{det}, \tag{18}$$

then the victim node does not suffer harmful interference if the interference distance is less than or equal to the detection distance minus the coverage distance:

$$d_{int} \leq d_{det} - d_{cov,p}. \tag{19}$$

As used herein, Equation (19) is referred to as the noninterference condition.

Figure 5:
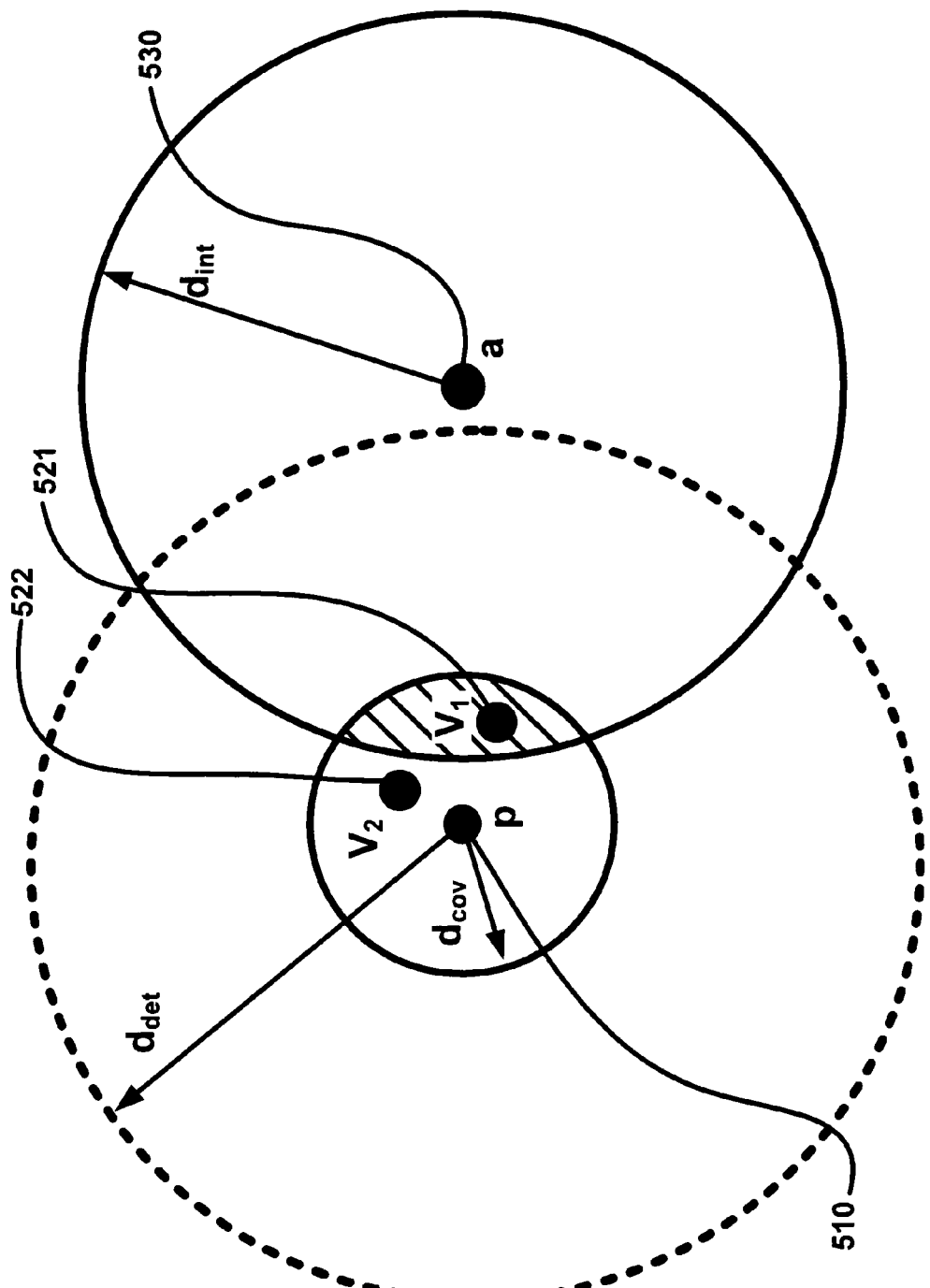
FIG. 5 shows an example cognitive radio node according to an embodiment of the invention positioned outside the detection distance of a primary node in a network where two victim nodes lie within the coverage region of the primary node.

In FIG. 5, a CR node a 530 lies just outside the detection distance $d_{det}$ of the primary node p 510, and the two victim nodes $v_1$ 521 and $v_2$ 522 lie within the coverage region of node p 410. Typically node $v_2$ 422 would not suffer harmful interference, since it lies beyond the interference region of the CR node a 530. However, the victim node $v_1$ 521 lies within the coverage region of node p 510 and within the interference region of node a 530. Hence, node $v_1$ 521 would potentially suffer harmful interference from node a 530. Similarly, any victim node lying within the shaded region may suffer harmful interference. The shaded region in FIG. 5 can be reduced by lowering the CR node transmit power $s_a$. If the coverage region of node p 510 and the interference region of node a 530 do not intersect, i.e., the shaded region is absent, then the noninterference condition is satisfied for all potential victim nodes.

B. Signal Detectors

As can be inferred from Equation (19), one way of avoiding a co-channel interference condition is to increase the value of $d_{det}$. From Equation (10), $d_{det}$ can be increased by reducing the detection threshold $\eta_{det}$. Thus, ultra-sensitive signal detectors may play an important role in frequency agile radio technology.

To achieve high utilization in cognitive WiMAX, the processing time of the detector may need to be relatively small, typically as small as possible. As an example, assuming a WiMAX TDD frame duration of 5 ms, the detector would need one frame time to determine the availability of a given subchannel. Wideband detectors can achieve a processing time of less than 2 ms, but are also the most expensive. Slower detectors could be used by amortizing the cost of sensing over one frame time over the lifetime of a connection assigned to a given subchannel; the longer the connection lifetime, the smaller the bandwidth wastage. Thus, the slower detectors may be efficient in terms of bandwidth utilization provided that the connection holding time is significantly larger than the detector processing time.

Cognitive WiMAX

According to embodiments of the invention, cognitive WiWAX may allow for the application of frequency-agile cognitive radio technology to WiMAX and similar networks to increase frequency reuse and network capacity, and to simplify network operations. The cognitive radio framework disclosed here may also be applied to conventional FDMA-based cellular networks. In some embodiments, it is believed that the impact of cognitive radio technology may be greater for WiMAX and similar network configurations and topologies due to its support for fine-grained and flexible frequency allocation. In cognitive WiMAX, each base station may be equipped with a frequency-agile CR and can assume the role of a primary node, a CR node, or a victim node with respect to dynamic spectrum access. In some embodiments of the invention, cognitive channel assignment (CCA) may be used.

Cognitive Channel Assignment

Embodiments of the invention use cognitive channel assignment (CCA), in which a base station may employ spectrum sensing with respect to subcarriers in WiMAX. To achieve this, the BS typically may be equipped with ultra-sensitive signal detectors. In CCA schemes according to embodiments of the invention, the cognitive radio functions of spectrum sensing and allocation may be performed at the BS. Subchannels allocated to a call may be deallocated to the general pool when the call ends. Thus, the MS does not need to be modified relative to conventional WiMAX. The use of power control in the CCA scheme may reduce, minimize, or eliminate cochannel interference and maximizes frequency reuse. CCA techniques according to embodiments of the invention also may be applied to other FDMA-based systems. In this case, the unit of bandwidth allocation may be a frequency channel rather then an OFDMA subcarrier.

Consider a WiMAX system with a set S of subcarriers available for OFDM data transmission. As discussed earlier, the OFDMA scheme of WiMAX allows multiple connections to share a given subcarrier within a TDM frame. However, once a subcarrier is allocated to a base station, suballocation of slots within the TDM frame may be managed locally by the base station without the need to consider cochannel interference constraints. Thus, it may be assumed that the subcarrier is the smallest unit of bandwidth that can be allocated to a connection or call without loss of generality.

Figure 2:
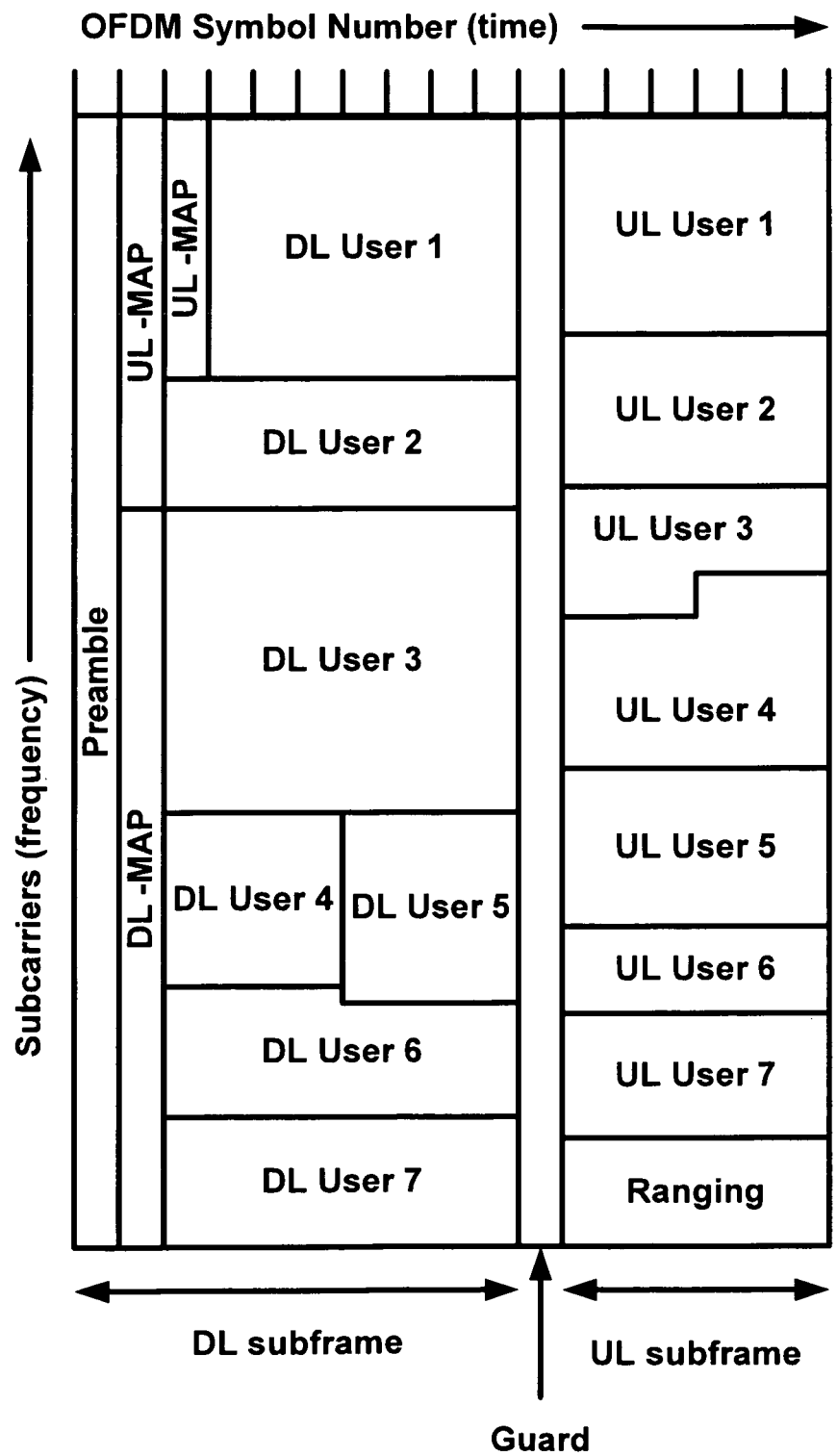
FIG. 2 shows a sample WiMAX TDD frame structure with 6 data regions.

Frequency-Division Duplexing: If frequency-division duplexing (FDD) is used, the set S may be partitioned into two sets U and D (see FIG. 2):

$$S = U \cup D, \quad (20)$$

where U is the set of subcarriers reserved for uplink transmissions and A is the set of subcarriers set aside for downlink transmissions. Let $U_i$ and $D_i$ denote, respectively, the set of uplink and downlink subcarriers currently in use by $BS_i$.

When a new call request from an MS arrives to cell i, the serving base station $BS_i$ may examine the received power levels from each of the subcarriers and determine the set $\hat{U}_i \subseteq U \setminus U_i$ of free uplink subcarriers as follows:

$$\hat{U}_i = \cup \{c \in U \setminus U_i : R_c < \eta_{up}\} \quad (21)$$

where $R_c$ is the received signal power from subcarrier c and $\eta_{up}$ is a detection threshold associated with uplink communications. Thus, $\hat{U}_i$ is the set of subcarriers not already in use by $BS_i$ with received power less than the detection threshold $\eta_{up}$. Similarly, the base station may determine the set $\hat{D}_i \subseteq D \setminus D_i$ of free downlink subcarriers:

$$\hat{D}_i = \cup \{c \in D \setminus D_i : R_c < \eta_{down}\} \quad (22)$$

where $\eta_{down}$ is a detection threshold associated with downlink communications. The determination of $\eta_{up}$ and $\eta_{down}$ is discussed in further detail below.

The base station may select a set of subcarriers from the set $\hat{U}_i$ to form an uplink subchannel $C_{up}$ to satisfy the bandwidth requirements of the call request on the uplink. If an insufficient number of uplink subcarriers are free, the call may be blocked. Otherwise, the base station may proceed to allocate the downlink subchannel $C_{down}$ by choosing a set of subcarriers from the set $\hat{D}_i$ to meet the requirements of the call on the downlink. If an insufficient number of downlink subcarriers is free, the call may be blocked. Then the sets $U_i$ and $D_i$ are updated as follows:

$$U_i \leftarrow U_i \cup C_{up}, D_i \leftarrow D_i \cup C_{down}, \quad (23)$$

2) Time-Division Duplexing: If TDD is used, each subcarrier is used for both uplink and downlink transmissions in different portions of the TDM frame, as illustrated in FIG. 1. Similar to the FDD case, let $U_i$ and $D_i$ denote, respectively, the set of uplink and downlink subcarriers currently in use by $BS_i$.

When a new call request from an MS arrives to cell i, the serving base station $BS_i$ may examine the received power levels from each of the subcarriers. Each BS may be equipped with a signal detector, which can estimate the received signal strength across all frequencies in the band of interest. The signal detector may take time series measurements and perform spectral estimation in one or more bands of interest. The base station may then determine the set $\hat{U}_i \subseteq U \setminus U_i$, of free uplink subcarriers as follows:

$$\hat{U}_i = \cup \{c \in S \setminus U_i : R_c^{(u)} < \eta_{up}\} \quad (24)$$

where $R_c^{(u)}$ is the received signal power from subcarrier c during the uplink portion of the TDM frame and $\eta_{up}$ is the uplink detection threshold. Thus, $\hat{U}_i$ is the set of uplink subcarriers not already in use by $BS_i$ with received power on the uplink portion of the TDM frame less than the detection threshold $\eta_{up}$. Similarly, the base station may determine the set $\hat{D}_i \subseteq D \setminus D_i$ of free downlink subcarriers as follows:

$$\hat{D}_i = \cup \{c \in S \setminus D_i : R_c^{(d)} < \eta_{down}\} \quad (25)$$

where $R_c^{(d)}$ is the received signal power from subcarrier c during the downlink portion of the TDM frame and $\eta_{down}$ is the downlink detection threshold.

The base station may select a set of subcarriers from the set $\hat{U}_i$ to form an uplink subchannel $C_{up}$ to satisfy the bandwidth requirements of the call request on the uplink. If an insufficient number of uplink subcarriers is free, the call may be blocked. Otherwise, the base station may allocate the downlink subchannel $C_{down}$ by choosing a set of subcarriers from the set $\hat{D}_i$ to meet the requirements of the call on the downlink. If an insufficient number of downlink subcarriers is free, the call may be blocked. If the call is not blocked, the allocated subchannels may be reserved for use by the current base station by updating the sets $U_i$ and $D_i$ as follows:

$$U_i \leftarrow D_i \cup C_{up}, D_i \leftarrow D_i \cup C_{down} \quad (26)$$

C. Downlink Allocation

Under a power control scheme, a base station $BS_i$ may determine the minimum power levels $s_a^{(u)}$ and $s_a^{(d)}$ to establish uplink and downlink communication links, respectively, with a subscriber station MS. The values of the detection thresholds $\eta_{up}$ and $\eta_{down}$ discussed in Section B, above, may depend on the values of the uplink and downlink transmit powers, denoted by $s_a^{(u)}$ and $s_a^{(d)}$, respectively.

Figure 6:
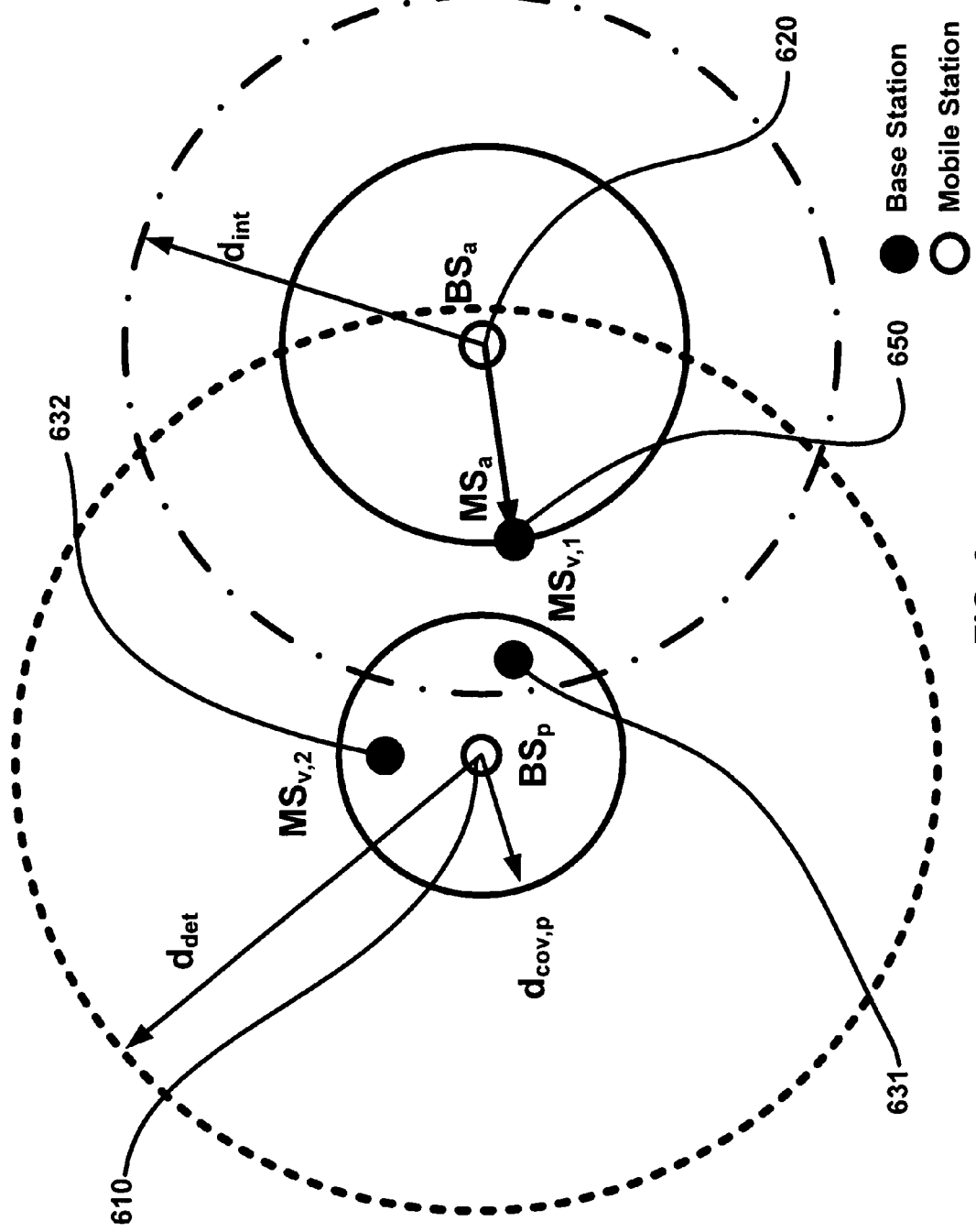
FIG. 6 shows an example LBT sensing scenario for downlink transmission according to an embodiment of the invention, where the primary node and the agile node are base stations.

FIG. 6 shows an LBT sensing scenario for downlink transmission, where a primary node, $BS_p$ 610, and an agile node, $BS_a$ 620, are base stations. Two victim nodes $MS_{v,1}$ 631 and $MS_{v,2}$ 632 lie in the coverage region of node $BS_p$, 610 i.e., they lie within the circle centered at node p with radius equal to the coverage distance $d_{cov,p}$. Thus, the outage probabilities of the victim nodes do not exceed $\epsilon_{out}$. The CR node a lies just outside the distance $d_{det}$ from the primary transmitter. Hence, the detection probability does not exceed $\epsilon_{det}$.

Although the subscriber $MS_{v,1}$ 631 lies beyond the detection distance, $d_{det}$, from the frequency-agile base station $BS_a$ 620, the subscriber $MS_{v,2}$ 632 does not. Therefore, the subscriber $MS_{v,1}$ 631 may suffer harmful interference since the interference probability experienced by subscriber $MS_{v,1}$ 631 exceeds $\epsilon_{int}$. To avoid co-channel interference on downlink transmissions, it may be useful to determine the detection and interference distances for base stations in the network. In the context of FIG. 6, the noninterference condition (19) becomes $$d_{int} < d_{det} - d_{cov,p}. \quad (27)$$

An LBT detection threshold, $\eta_{down}$, to ensure that Equation (27) is satisfied for downlink allocation may is given as follows:

$$\eta_{down} = s_p - \alpha_{p,a} - g(g^{-1}(s_a - i_{max} + \alpha_{a,v}) + g^{-1}(s_p - r_{min} + \alpha_{p,v})) \quad (28)$$

where $\alpha_{p,a}$, $\alpha_{a,v}$, and $\alpha_{p,v}$ are defined in Equations (12), (17), and (8), respectively. In this case, $s_a$ is denoted by $s_a^{(d)}$ to emphasize that it represents the CR node transmit power used on the downlink. A suboptimal approximation to $\eta_{opt,down}$ can be obtained from (28) by setting $\alpha_{p,a}=\alpha_{a,v}=\alpha_{p,v}=0$. In calculating the downlink detection threshold $\eta_{down}$ using (28), the primary node transmit power $s_p$ may be set to the minimum base station transmit power. The CR node transmit power $s_a$ also may be set to a value used by $BS_a$ 620 to establish a link with the mobile station $MS_a$ 650 when using power control.

Figure 7:
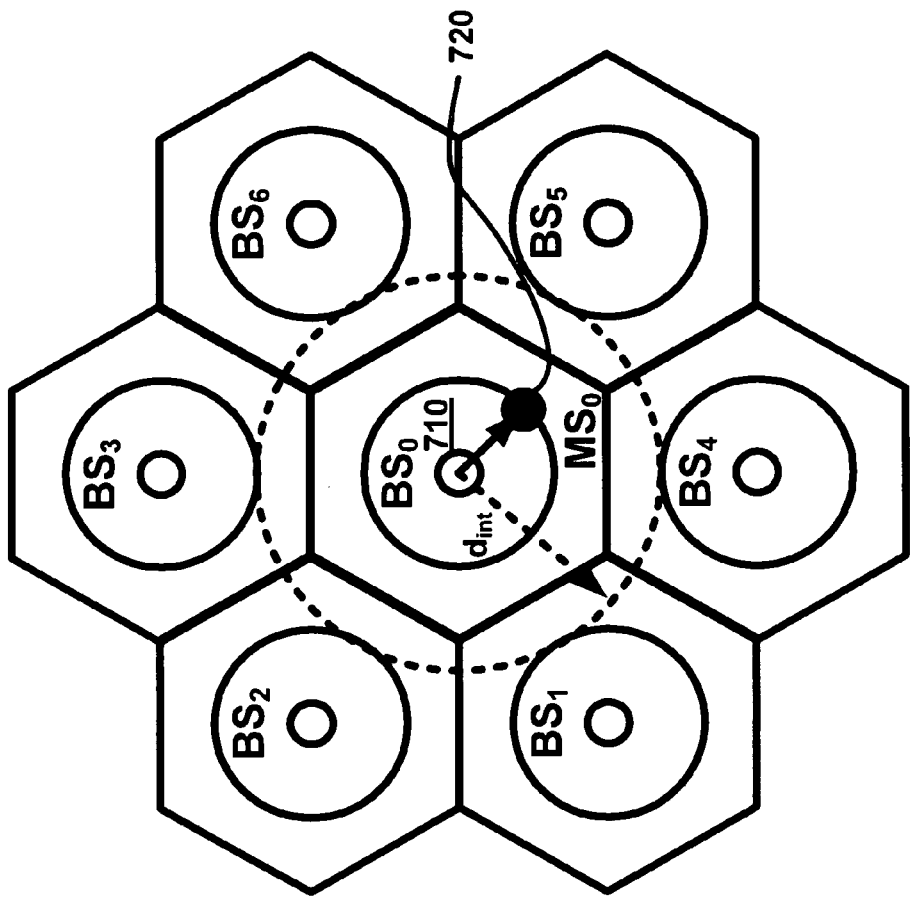
FIG. 7 shows an example spectrum occupancy map for a cellular scenario involving the allocation of a subcarrier for the downlink from a base station to a mobile station.
Figure 8:
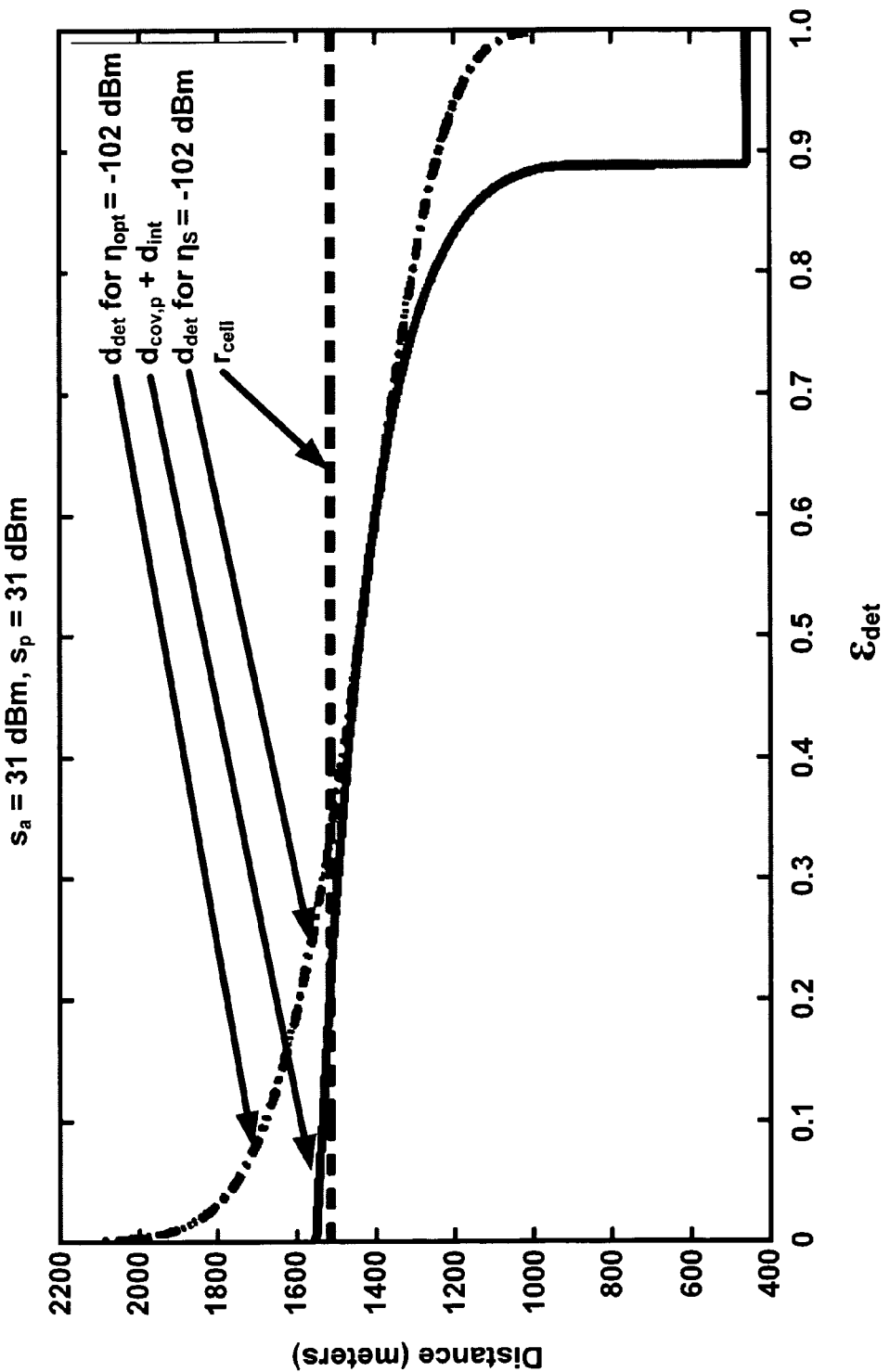
FIGS. 8-11 show plots of the detection distance for an example downlink scenario as a function of the detection probability for different values of detection thresholds according to embodiments of the invention.
Figure 9:
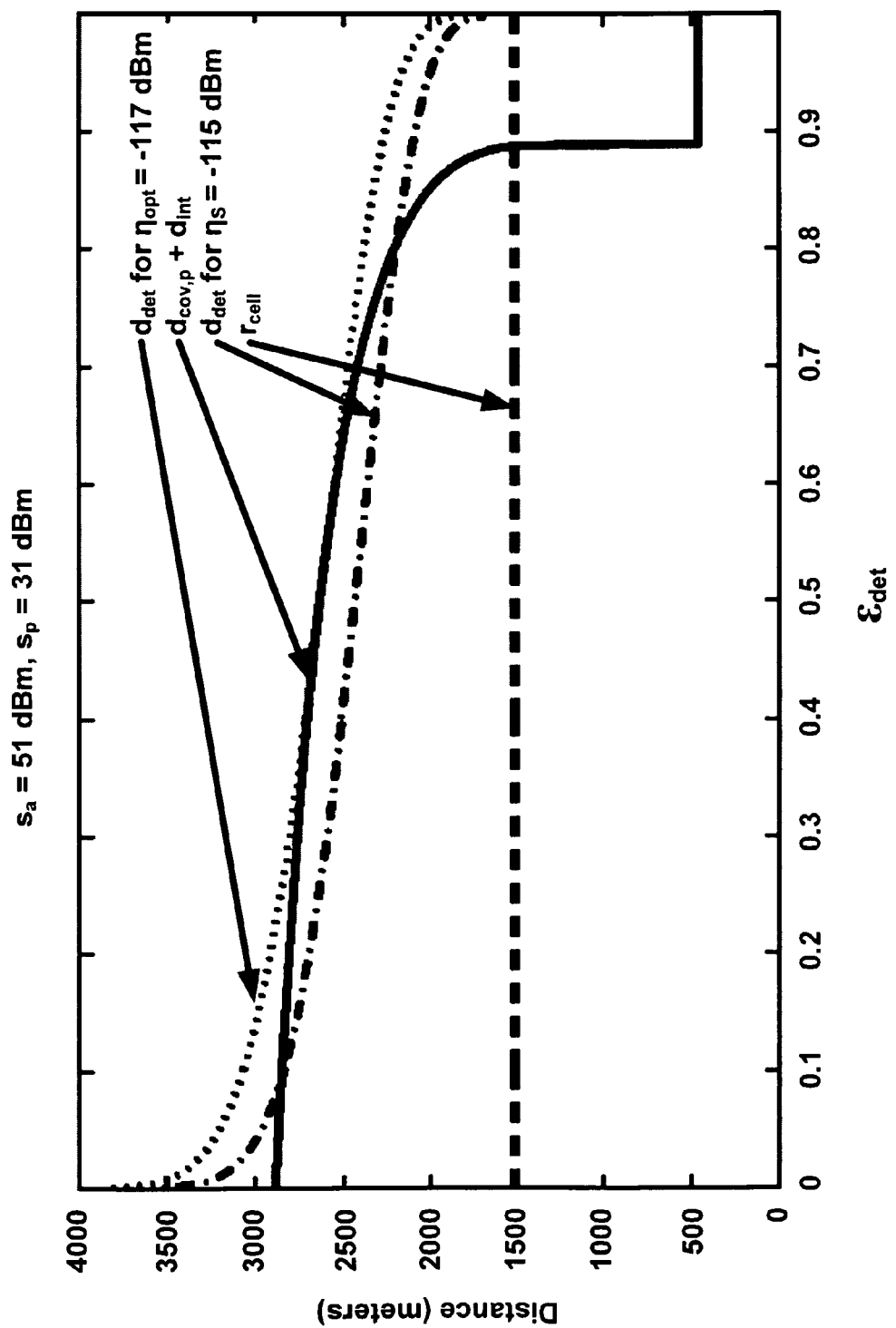
Figure 10:
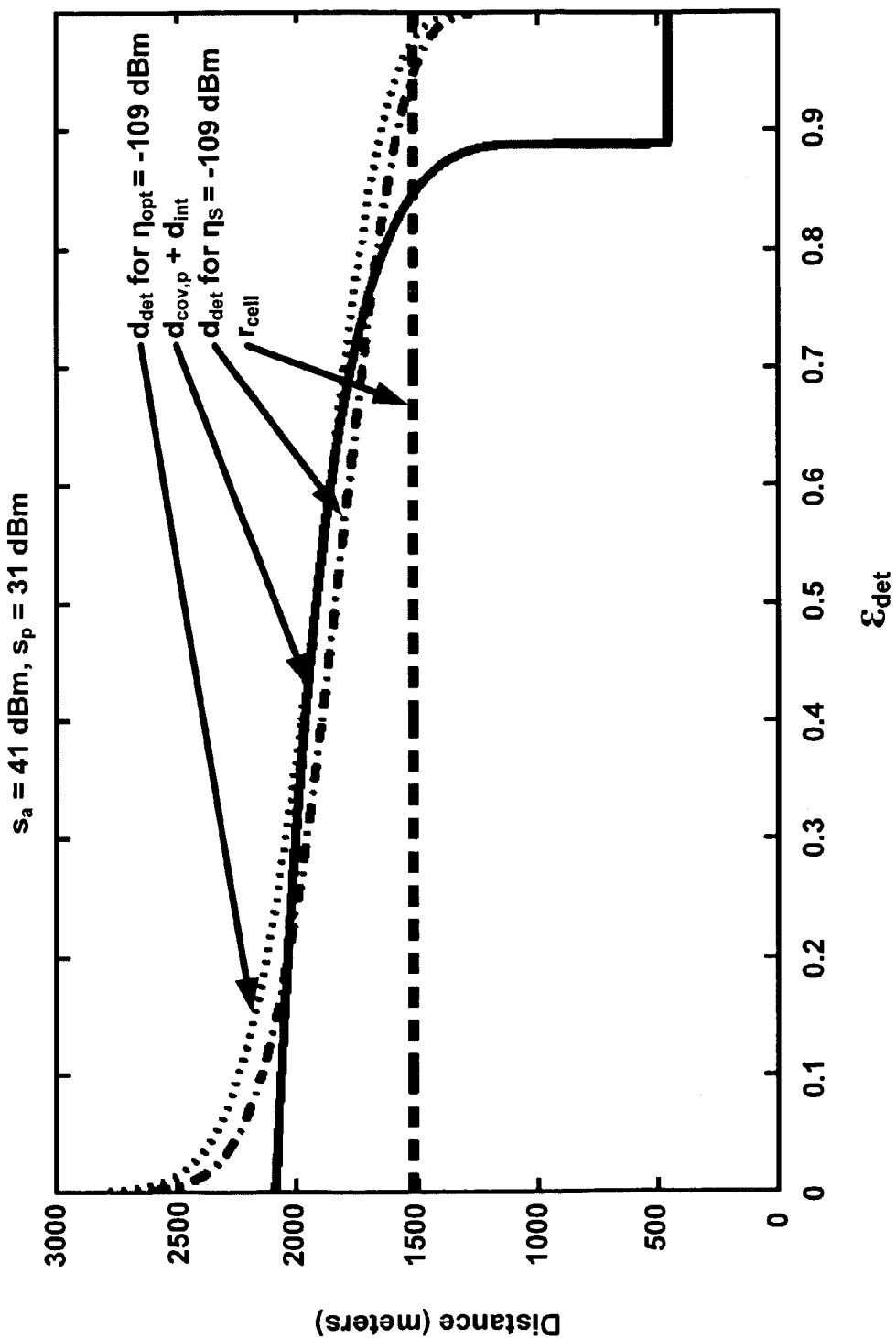
Figure 11:
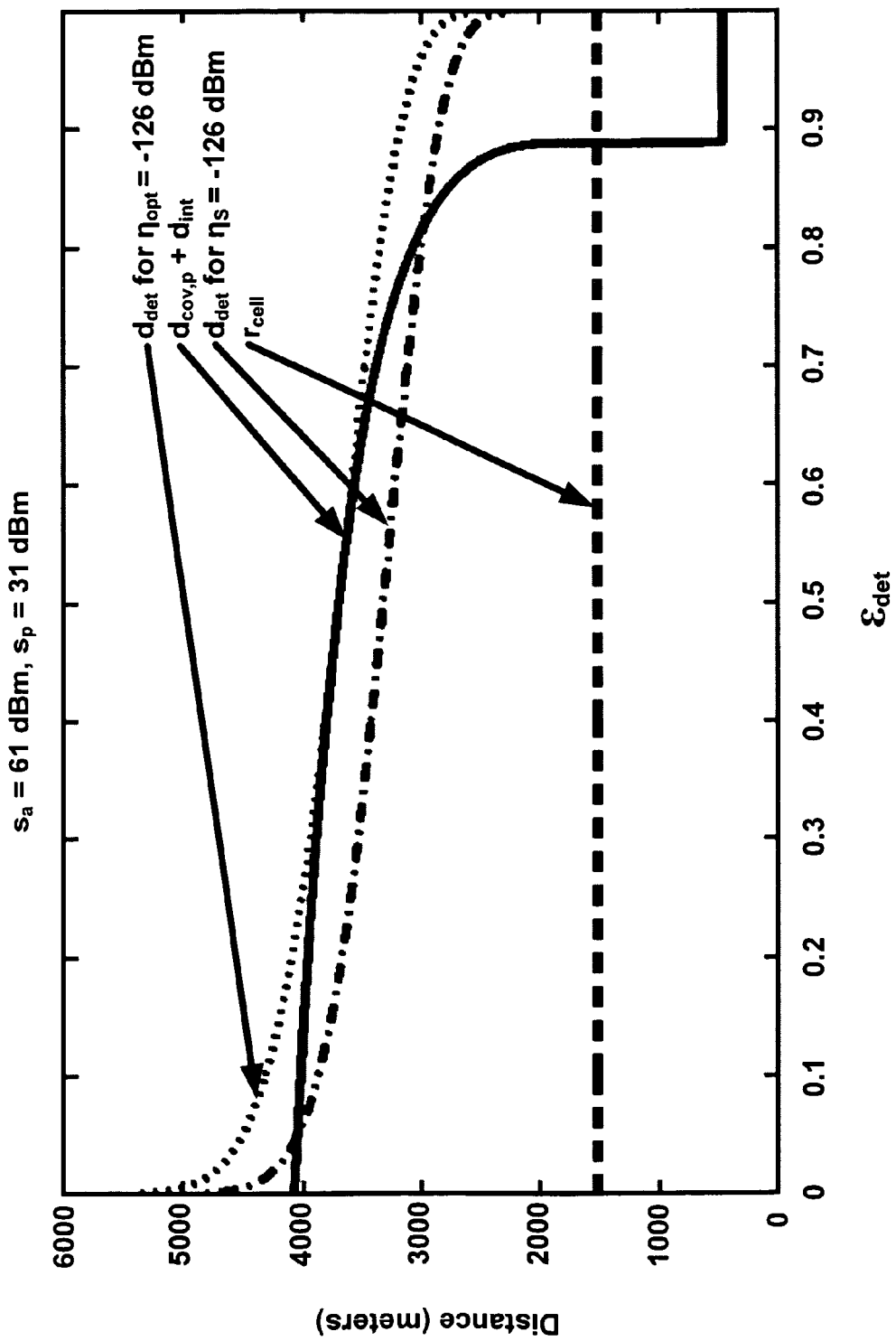

FIG. 7 illustrates a spectrum occupancy map for a cellular scenario involving the allocation of a subcarrier for the downlink from $BS_0$ 710 to $MS_0$ 720. In reference to this figure, the neighboring base stations around $BS_0$ 710 can reuse the same downlink subcarrier only if the mobile station $MS_0$ 720 is situated outside the interference region of $BS_0$ 710. This condition may be automatically satisfied since these base stations also calculate detection thresholds.

FIGS. 8-11 show plots of the detection distance $d_{det}$ for the downlink scenario as a function of the detection probability $\epsilon_{det}$ for different values of the detection thresholds. The graphs also show the sum of the interference and coverage distances, i.e., $d_{int}+d_{cov,p}$, as a function of the detection probability $\epsilon_{det}$. The noninterference condition (19) is equivalent to:

$$d_{int} < d_{cov,p} \leq d_{det}. \tag{29}$$

In all four graphs, the curve corresponding to $d_{cov,p}+d_{int}$ dips sharply at $E_{det} \approx 0.89$. This can be shown analytically by noting that the argument of $g^{-1}(\cdot)$ in Equation (16) must be positive, i.e., $$s_a - i_{max} - \alpha_{a,v} > 0. \tag{30}$$

Using Equation (17), the following condition may be derived:

$$\epsilon_{det} < 1 - \left(\frac{\epsilon_{int}}{1-P_{out}}\right) \cdot \left[1 - Q\left(\frac{s_a - i_{max}}{\sigma_{a,v}}\right)\right]^{-1}. \tag{31}$$

For the scenarios represented in FIGS. 8-11, $\epsilon_{int}=0.1$, $P_{out}=0.1$, $i_{max}=-132$ dBm, and $\sigma_{a,v}=3$ dB. For any value of $s_a$ in the range 31 to 61 dBm, the term in the square brackets in Equation (31) is approximately one and hence the right-hand side of Equation (31) is approximately 0.89. Hence, as $\epsilon_{det} \rightarrow 0.89$, $d_{int} \rightarrow 0$ for the four values of $s_a$ considered in FIGS. 8-11 the solid curve tends to the value $d_{cov,p}$.

Example system parameters for a downlink scenario are as follows:
CR downlink transmitter power $s_a^{(d)}$ varies from 31 to 61 dBm;
primary transmitter power $s_p$ varies from 31 to 61 dBm;
system bandwidth is 10 MHz and the number of subchannels is 16;
receiver noise figure NF=8 dB, the required signal-to-noise ratio SNR=0.8 dB, and the receiver gain is RG=0 dB;
interference probability $P_{int}=0.01$;
maximum outage probability $P_{out}=0.1$;
minimum received signal threshold at the subscriber station:

$$r_{min}=N_{floor}+NF+SNR-RG, \tag{32}$$

where the noise floor is given by $$N_{floor}=-174 \text{ dBm/Hz}+10 \log_{10}B=-134 \text{ dBm}, \tag{33}$$

where the subcarrier bandwidth is B=10 kHz.

maximum interference threshold at the mobile station:

$$i_{max}=N_{floor}+NF+INR, \tag{34}$$

where $N_{floor}$ and NF have values given above. In the numerical results presented in the performance study described below, the INR was set at −6 dB.

Example downlink antenna parameters are as follows:
carrier frequency $f_c=2.4$ GHz;
victim receiver (MS) antenna height, $h_v=2$ m;
CR and primary transmitter (BS) antenna height, $h_a=h_p=10$ m.

These parameter values may reflect worst-case scenarios within the following range of parameter values, for which the Erceg models are valid:

1.9 GHz $\leq f \leq$ 3.5 GHz, 10 m $\leq h_b \leq$ 80 m, 2 m $\leq h_m \leq$ 10 m, 0.1 km $\leq d \leq$ 8 km.

The propagation loss between the transmitters and receivers may be assumed to follow the Erceg C path loss model (Erceg, V. et al., IEEE J. on Selected Areas in Commun., 17:1205-1211, (June 1999)) with shadowing standard deviations $\sigma_{a,v}=\sigma_{p,v}=6$ dB and $\sigma_{a,p}=3$ dB. The Erceg model is commonly used in performance studies of WiMAX.

Both the detection distance and the interference distance are monotonically decreasing functions of the detection probability. To avoid harmful interference, the detection threshold may be chosen such that the noninterference condition (27) holds over the entire range of values of $\epsilon_{det}$, since no prior knowledge of the detection probability is assumed. An example power control range for the downlink transmission is between 31 and 61 dBm.

In an embodiment, the optimum LBT downlink detection threshold ranges from $\eta_{opt}=-125$ to $-102$ dBm. The simplified formula gives a suboptimal LBT threshold value ranging from $\eta_s=-123$ to $-102$ dBm. For a 625 kHz bandwidth, this is a sensitivity of approximately $-125$ dBm. Thus, downlink power allocation for cognitive WiMAX can be realized by modern ultra-sensitive detector technology.

D. Uplink Allocation

Figure 12:
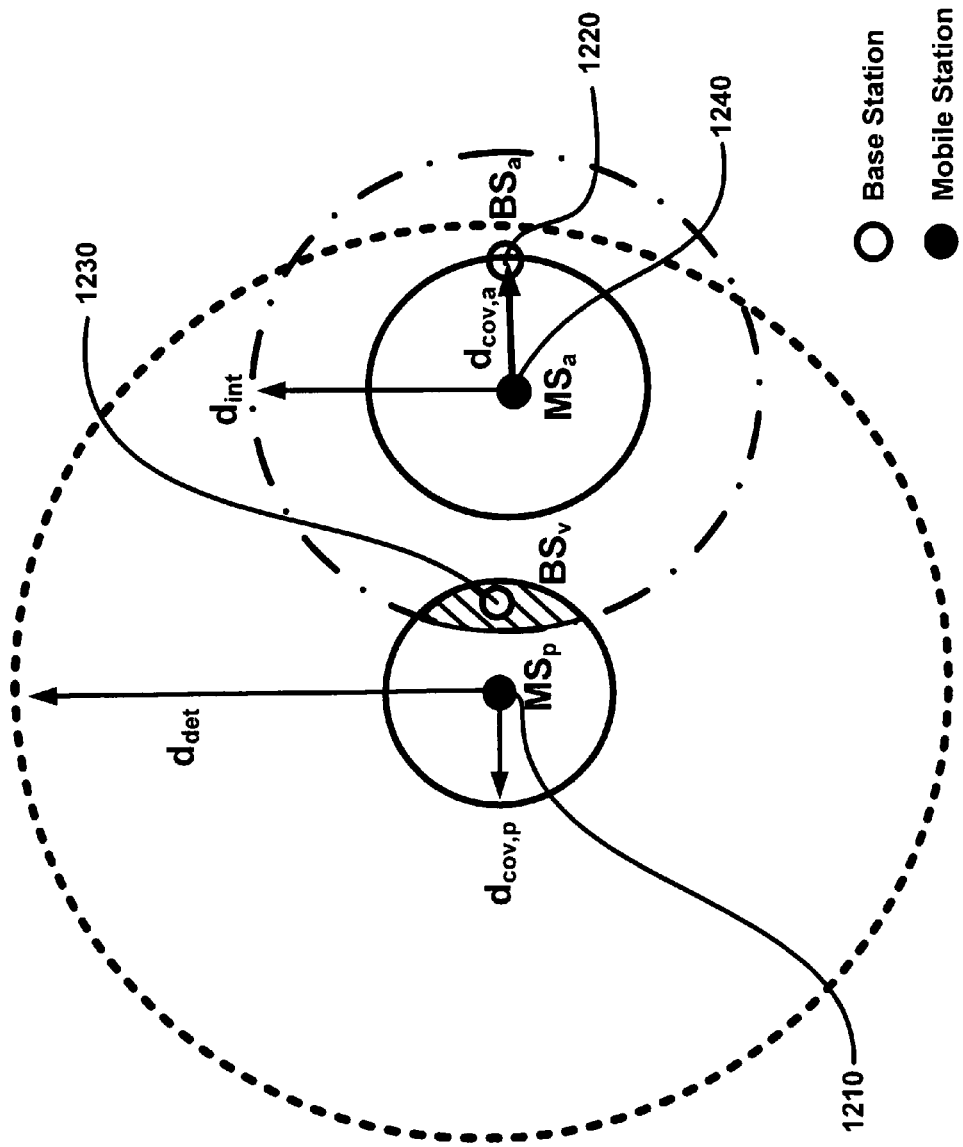
FIG. 12 shows an LBT sensing scenario for an example uplink transmission according to an embodiment of the invention, where a primary node is a mobile station and the frequency-agile node is a base station.

FIG. 12 presents an example LBT sensing scenario for uplink transmission, where a primary node, $MS_p$ 1210, is a subscriber station and a frequency-agile node, $BS_a$ 1220, is a base station. A victim node, $BS_v$ 1230 is a base station situated within the coverage region around the primary subscriber, $MS_p$ 1210. The uplink transmission power allocation, $s_a^{(u)}$, for the new subscriber station $MS_a$ 1240 is based on the LBT algorithm and power control employed at its receiving base station $BS_a$ 1220.

Similarly as for downlink transmission, the detection and interference distances for base station and subscriber station may be determined, respectively, to avoid co-channel interference on uplink transmissions. Similar to the noninterference condition (27) on the downlink, a simple sufficient condition for the victim subscriber not to suffer harmful interference can be expressed by an inequality relating the coverage distances $d_{rov,p}$, $d_{cov,a}$, the detection distance $d_{det}$, and the interference distance $d_{int}$ as follows:

$$d_{int} \leq d_{det} - d_{cov,p} - d_{cov,a}. \tag{35}$$

Figure 13:
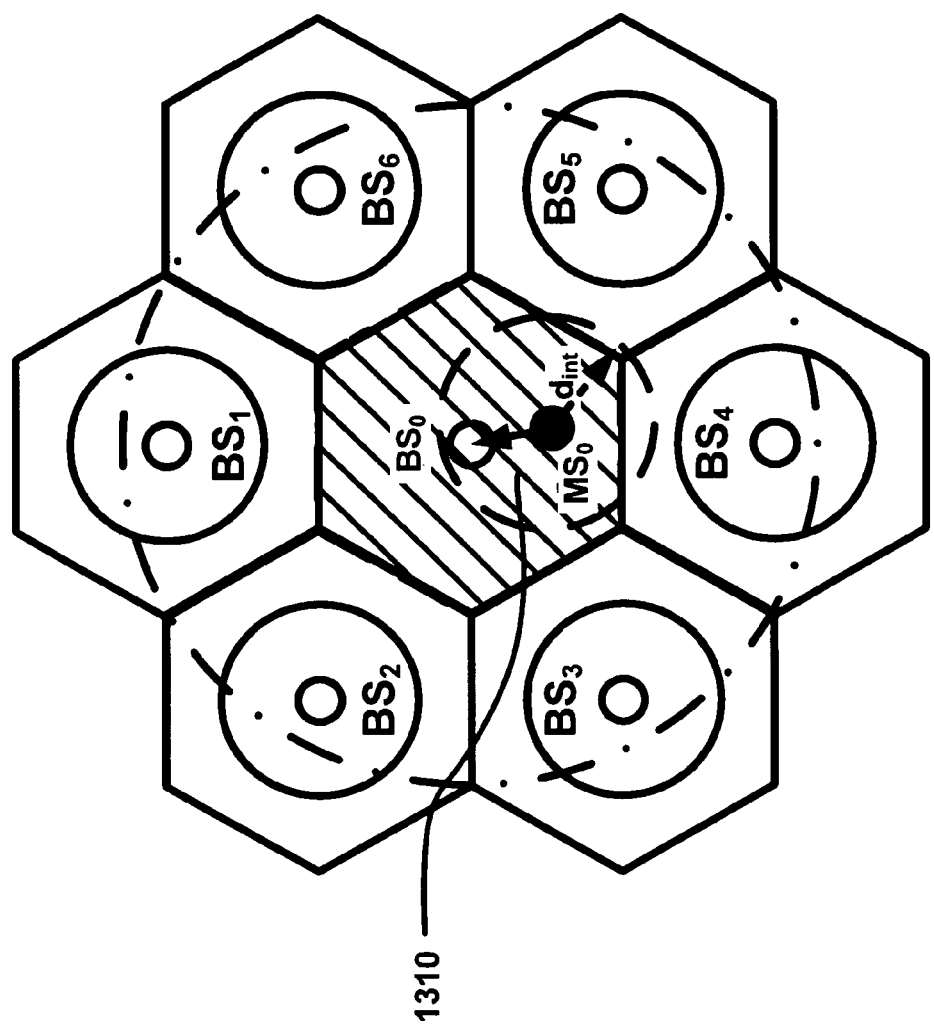
FIGS. 13-15 are spectrum maps for example scenarios of uplink spectrum allocation with a mobile station situated in different locations within a cell according to embodiments of the invention.
Figure 14:
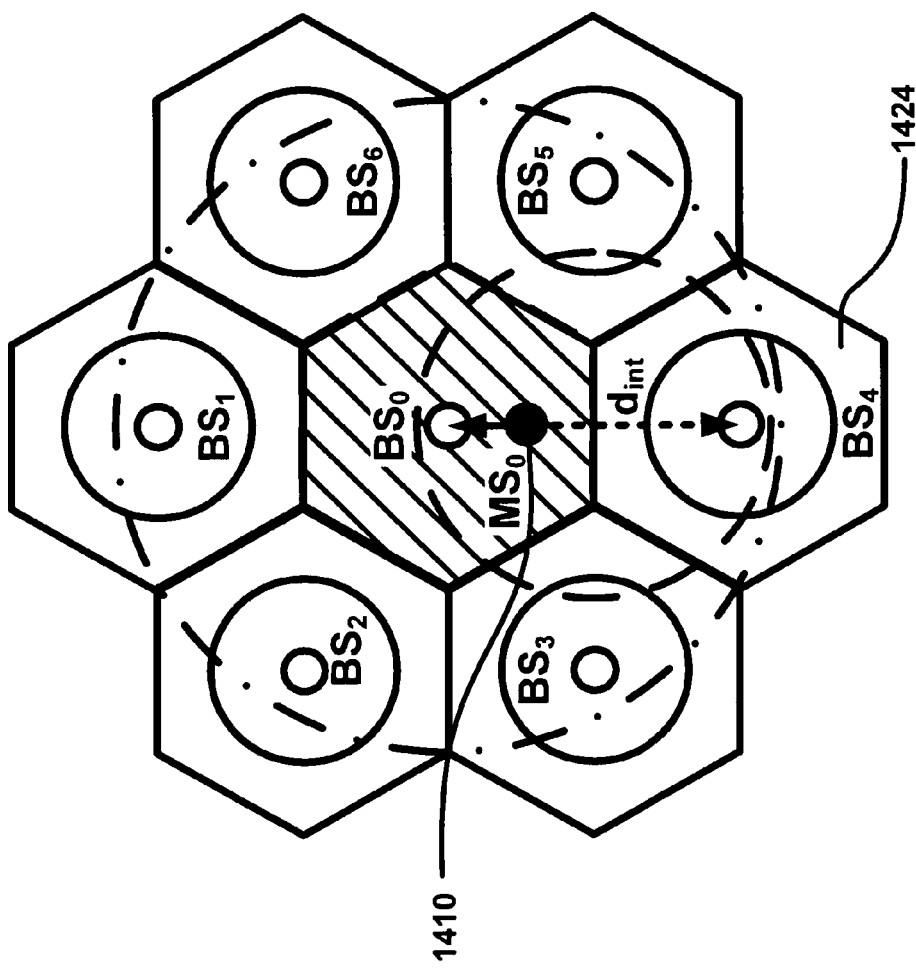
Figure 15:
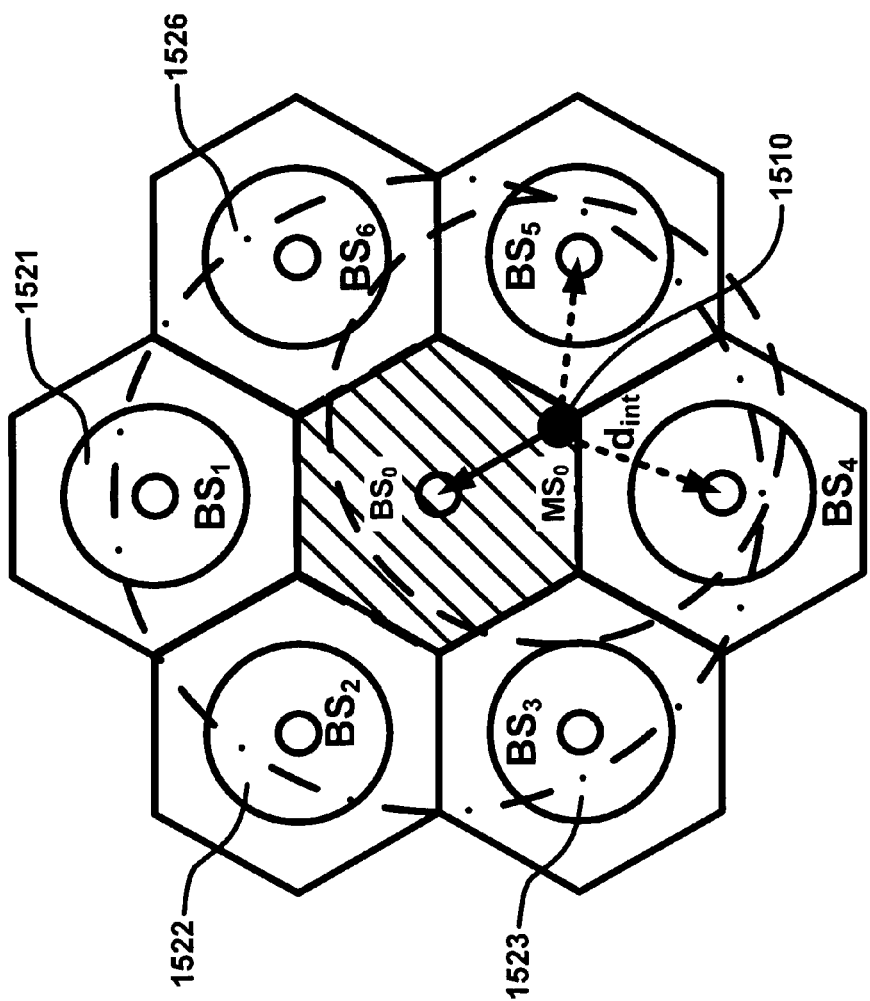
Figure 16:
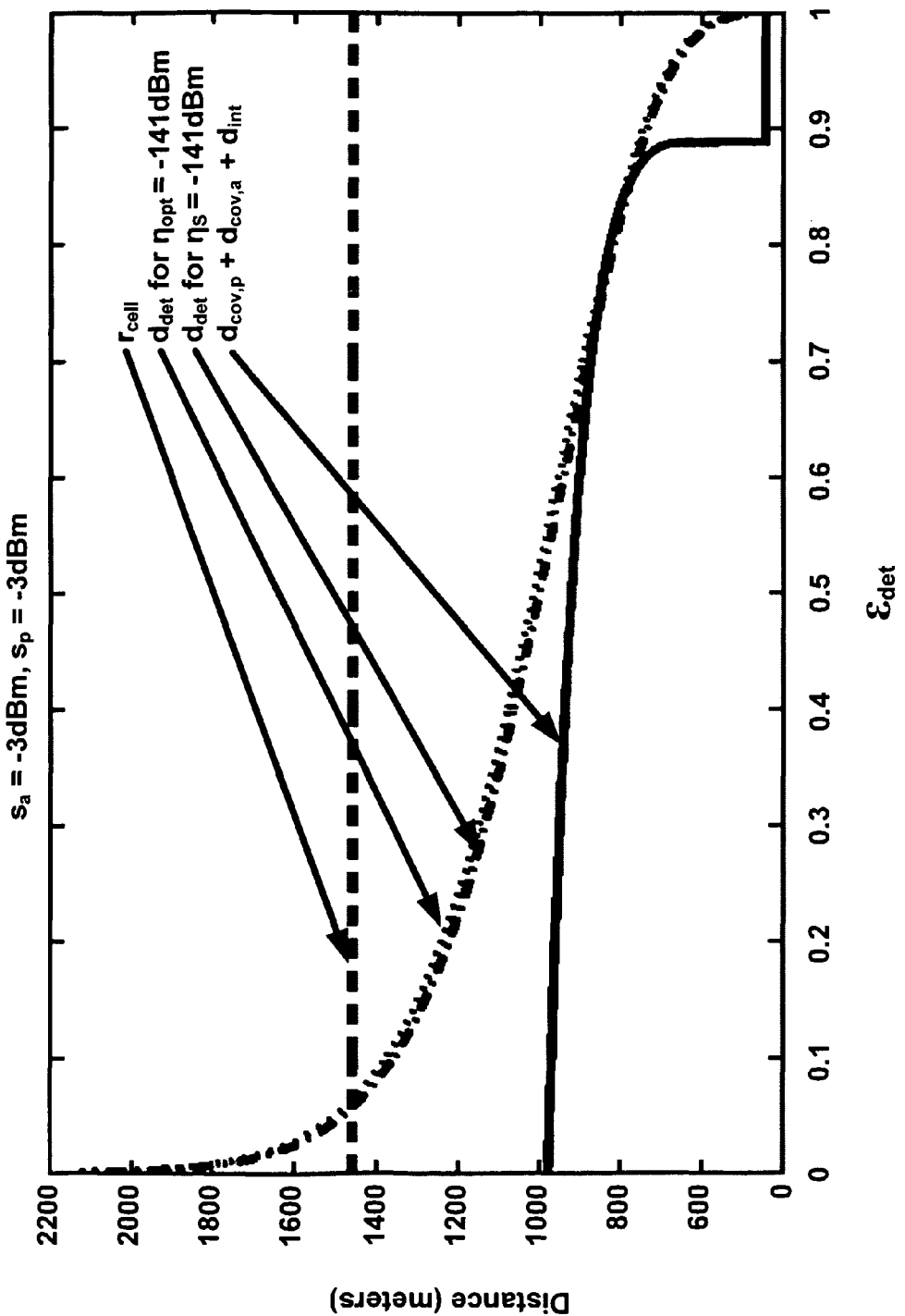
FIGS. 16-19 show plots of detection distances as functions of detection probability according to embodiments of the invention.
Figure 17:
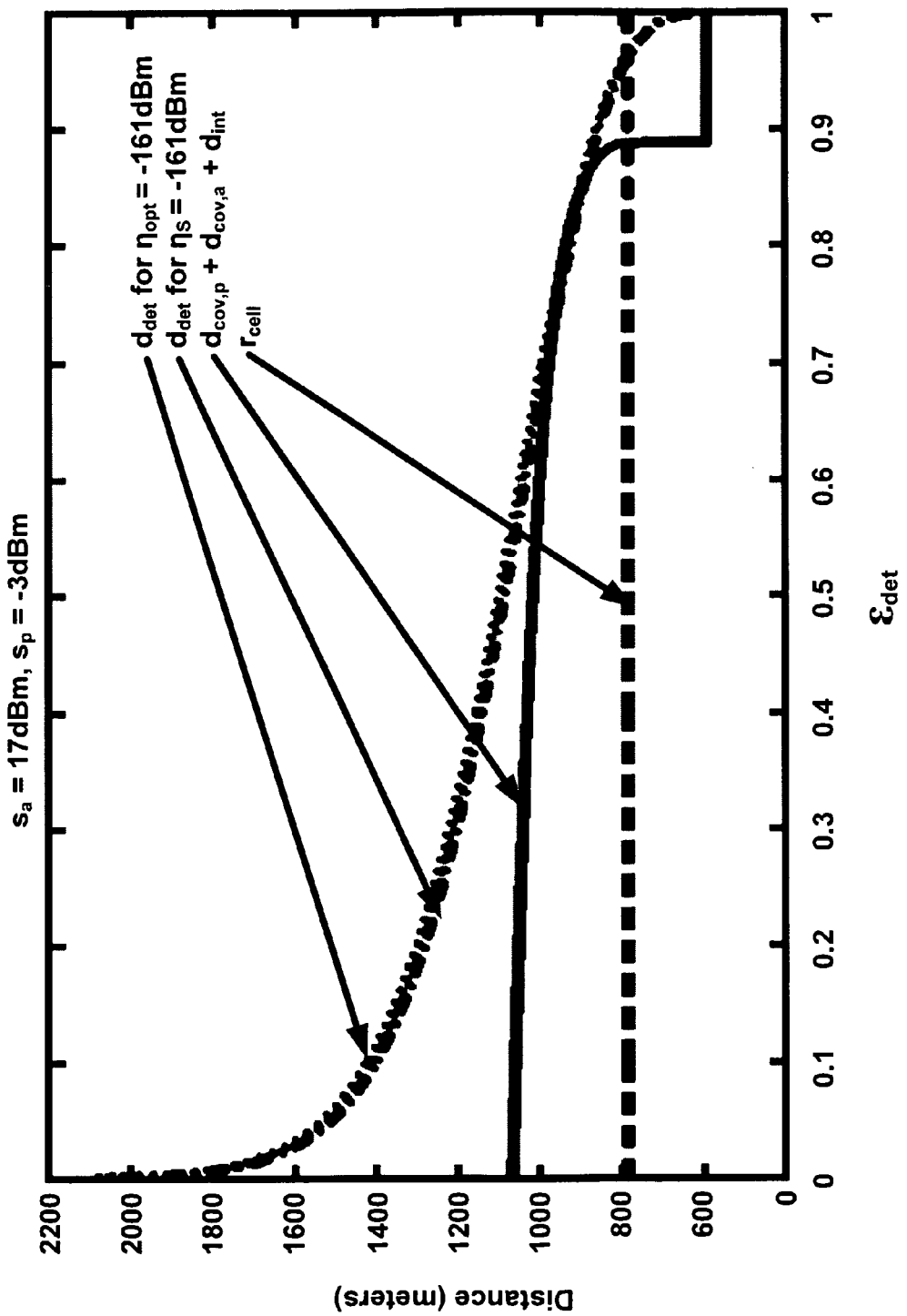
Figure 18:
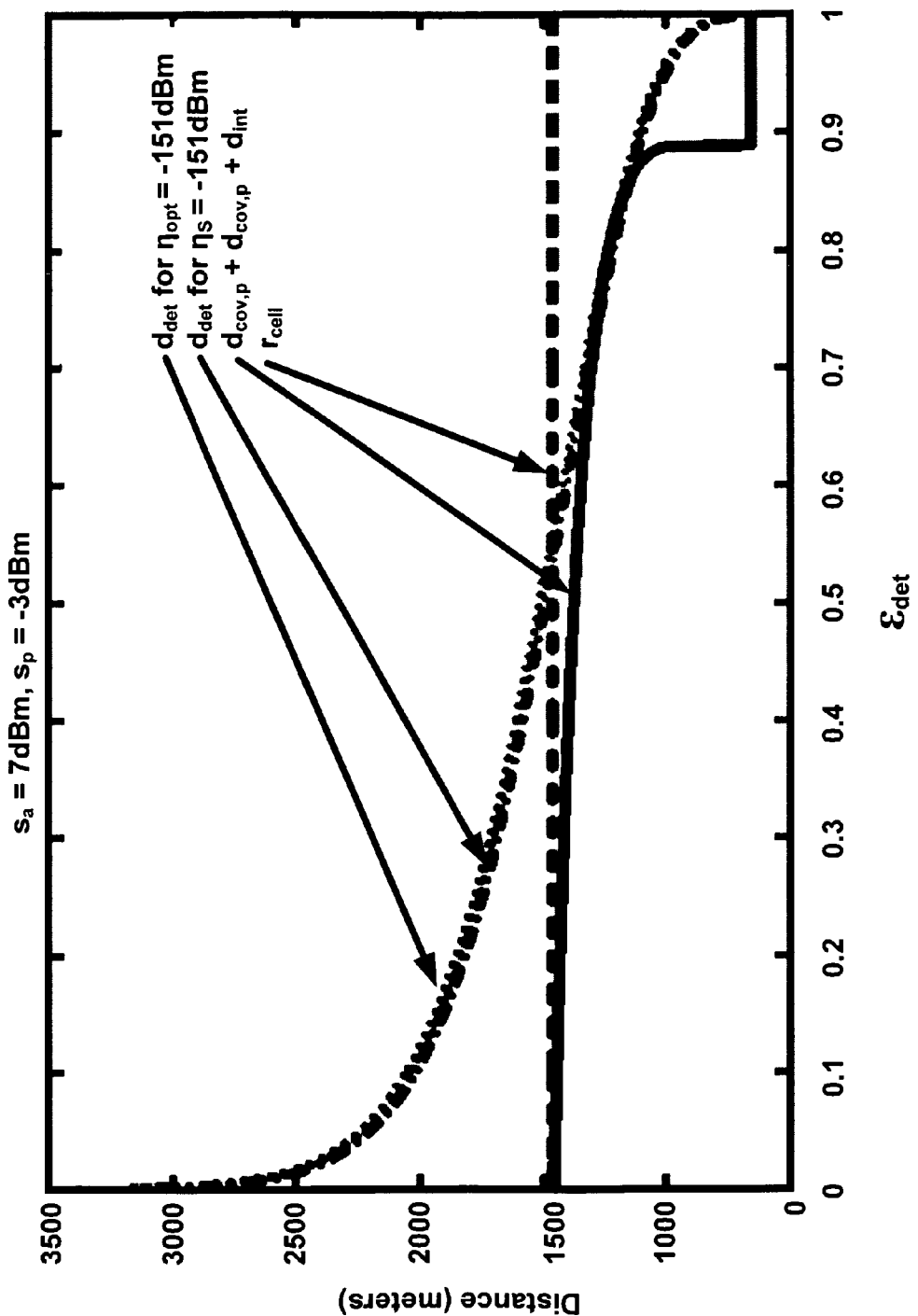
Figure 19:
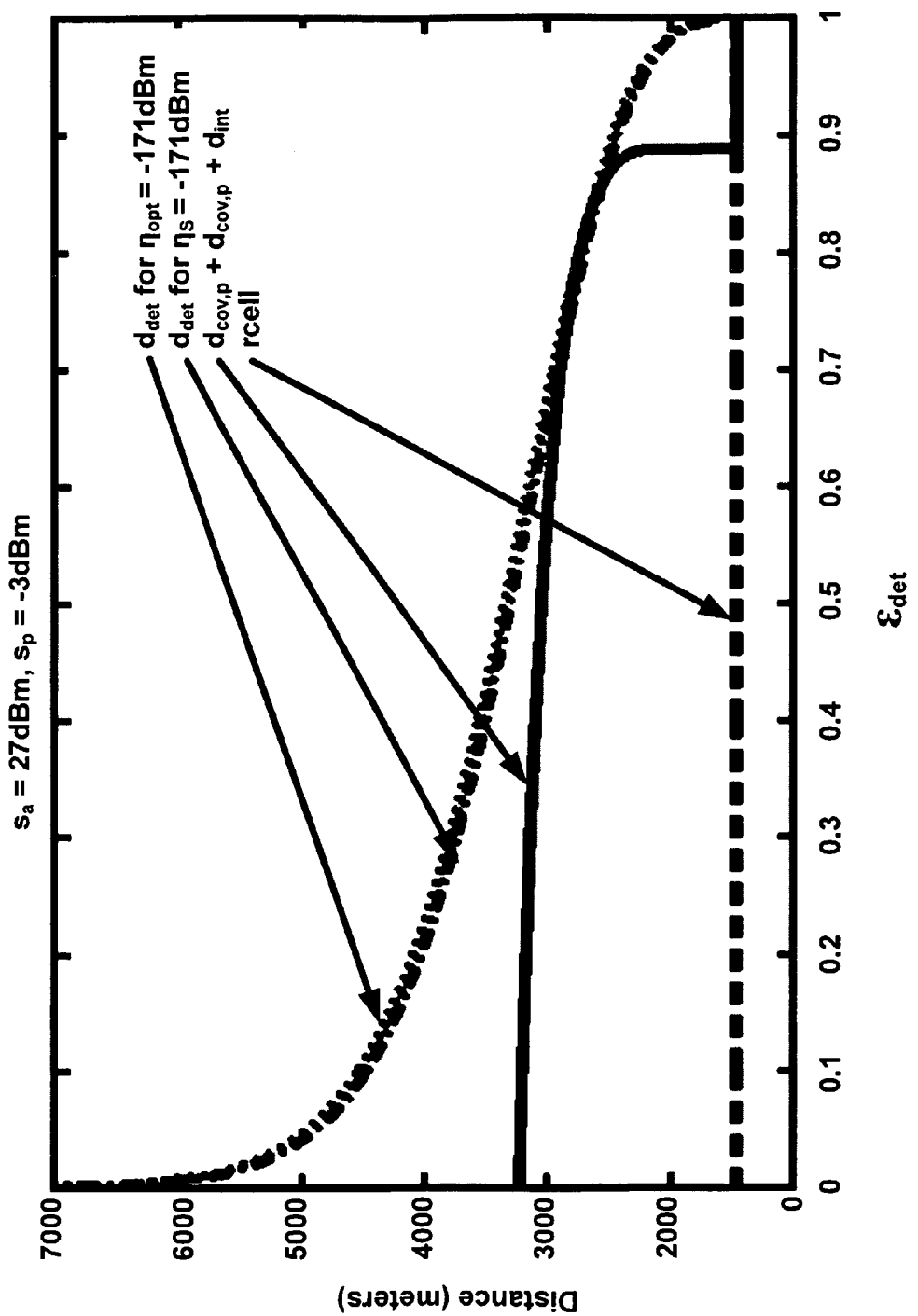

For uplink transmissions, the receivers are the base stations that are located at the centers of their associated cells. A set of subcarriers can be assigned to a user for the uplink connection with the base station in its cell as long as this does not cause co-channel interference to neighboring base stations that are currently tuned to some of the subcarriers in the same set. FIGS. 13-15 illustrate three scenarios of the uplink spectrum allocation with a subscriber station $MS_0$ 1310 situated in different locations within cell 0. FIG. 13 shows a configuration where $MS_0$ 1310 is located close to $BS_0$ 1320, so that the interference range does not include any neighboring base stations. In this configuration any of the subcarriers in the assigned set may be reused in any of the surrounding cells for uplink connections. FIG. 14 shows a configuration where the subscriber $MS_0$ 1410 is located close to the edge delimiting two neighboring cells, so that the interference range includes a neighboring base station. In this case any of the subcarriers in the assigned set may be reused by any of the neighboring base stations except $BS_4$ 1424. FIG. 15 shows a configuration with the subscriber $MS_0$ 1510 located at the borders of three cells, so that the interference range can include three or more base stations. In this case any of the subcarriers in the assigned set can be reused by the neighboring base stations that are not included in the interference region, i.e., $BS_1$ 1521, $BS_2$ 1522, $BS_3$ 1523 and $BS_6$ 1526.

Similar to the downlink detection threshold given in Equation (28), the optimum uplink LBT detection threshold can be found as follows:

$$\eta_{up} = s_p - \alpha_{p,a} - g(g^{-1}(s_a - i_{max} + \alpha_{a,v}) + g^{-1}(s_a - r_{min} + \alpha_{a,v}) + g^{-1}(s_p - r_{min} + \alpha_{p,v})). \quad (36)$$

In this case, $s_a$ is denoted by $s_a^{(u)}$ to emphasize that it represents the CR node transmit power on the uplink. A (suboptimal) approximate uplink LBT detection threshold can be obtained from Equation (36) by setting $\alpha_{p,a} = \alpha_{a,v} = \alpha_{p,v} = 0$.

An example uplink scenario may use the following system parameters:
  CR transmitter power $s_a^{(u)}$ varies from −3 to 27 dBm;
  primary transmitter power $s_p$ varies from −3 to 27 dBm;
  interference probability $P_{int} = 0.01$;
  maximum outage probability $P_{out} = 0.1$;
  minimum received signal threshold at the BS is given by Equation (32) where the noise figure is NF=4 dB, the signal-to-noise ratio is SNR=1.8 dB, and the receiver gain is RG=18 dB. The noise floor is as given in Equation (33);
  maximum interference threshold at the BS is given by Equation (34) where the noise figure NF and noise floor are as given above. In the performance study described below, the interference-to-noise ratio INR is set to values of 6 and −6 dB.

Example uplink antenna parameters are:
  CR and victim receiver antenna height, $h_v = 10$ m;
  CR and primary transmitter antenna height, $h_a$, $h_p = 2$ m.
    The propagation loss between the transmitters and receivers is given by the Erceg C path loss model (Erceg, V. et al., IEEE J. on Selected Areas in Commun., 17:1205-1211, (June 1999)) with shadowing standard deviations $\sigma_{a,v} = \sigma_{p,v} = \sigma_{a,p} = 6$ dB.

With respect to FIGS. 16-19, the noninterference condition requires the $d_{det}$ curve to lie above the $d_{int} + d_{cov,p} + d_{cov,a}$ curve for optimum LBT detection thresholds. The power control range for uplink transmission is assumed to lie between −3 and 27 dBm. The behavior of the curves representing $d_{cov,p} + d_{int}$ can be derived analytically as discussed above.

An optimal uplink detection threshold ranges from $\eta_{opt} = -169$ to −147 dBm, while the simplified formula gives a suboptimal LBT threshold ranging from $\eta_s = -170$ to −149 dBm. Detectors with sensitivities as low as −169 dBm may not be physically realizable with current technology. Uplink power allocation may require greater detection sensitivity than downlink allocation primarily due to the lower transmit power used by the mobile station on the uplink.

To circumvent this problem, downlink detection may be leveraged to perform uplink power allocation by imposing the requirement that a whenever a subcarrier is assigned on the uplink for a user, a portion of the downlink TDM subframe (see FIG. 1) must be reserved for the same user. In this way, detection of a downlink signal for a given subcarrier implies that the uplink subcarrier is also occupied. Thus, power allocation on the uplink may be determined via signal detection on the downlink.

Without further elaboration, it is believed that one skilled in the art using the preceding description can utilize the invention to its fullest extent. The following examples, experiments, studies, and data are illustrative, and not limiting of the disclosure in any way whatsoever.

Performance Study

The performance of cognitive WiMAX with respect to call blocking as a quality-of-service metric was studied. It was found that LBT-based cognitive channel assignment can result in increases in network capacity compared to conventional FCA and DCA channel assignment schemes. The performance study presented below is given in terms of frequency channels for the sake of simplicity and to facilitate comparison with conventional cellular systems.

For simplicity, it is assumed that all subchannels are of equal bandwidth. Furthermore, only unsolicited grant services (UGS) are considered in the context of voice circuit emulation. Under the assumption of OFDMA subcarriers of equal bandwidth, the channel assignment behavior of an OFDMA system reduces to that of a conventional FDMA-based cellular system. However, OFDMA subcarriers are narrowband to alleviate the problem of frequency-selective fading.

Furthermore, only TDD-based systems were considered in the study. In this context, the standard assumptions are made that call requests arrive according to a Poisson arrival process and that call holding durations are exponentially distributed. The cellular network is assumed to have a hexagonal layout. The spatial distribution of requesting subscriber stations is assumed to be uniform over the coverage area.

A. Blocking Probability Evaluation

The blocking probability for the FCA scheme (without channel borrowing) can be expressed in closed form by the Erlang loss formula (cf. (Mark, J. W. et al., Wireless Communications and Networking. Prentice Hall, (2003))):

$$B_{FCA} = \frac{\rho^J / J!}{\sum_{j=0}^{J} \rho^j / j!} \quad (37)$$

where J is the number of channels allocated to a given cell and $\rho$ is the traffic intensity in the cell. The traffic intensity $\rho$ is specified in units of Erlangs and can be expressed as $\lambda/\mu$, where $\lambda$ is the mean arrival rate to a cell and $1/\mu$ is the mean cell holding time. The FCA blocking probability given by (Chou, C.-T. et al., IEEE J. Selected Areas in Comm., 25:576-588, (April 2007)) provides a useful lower bound on the performance of channel assignment schemes. An upper bound on performance can be obtained by considering the blocking probability when the frequency reuse factor is unity, i.e., all of the system channels are allocated to each cell. If N is the cluster size, then the total number of channels in the system is K=JN. Hence, the blocking probability under unit reuse factor (RF) is given by $$B_{RF1} = \frac{\rho^K / K!}{\sum_{k=0}^{K} \rho^k / k!} \quad (38)$$

The blocking probabilities for DCA and CCA were evaluated using computer simulations. The simulation program generates call requests according to a Poisson process. When an arrival event occurs, the location of the mobile station is drawn from a uniform distribution over the coverage area. Based on the mobile station location, the corresponding cell is determined. The call holding time in the cell is drawn from an exponential distribution.

To simulate the operation of DCA, a list of channels is maintained for each base station in the system. Each channel is marked as either "free" or "occupied." When a call request arrives to a cell i, the call is assigned a free channel, if one is available. In this case, the channel is marked as occupied for all other cells in the cluster centered at cell i. Otherwise, if no free channel is available, the call is blocked. The simulation program performs the appropriate updates of the base station channel lists whenever a channel is released by a call.

Similar to the case of DCA, simulation of CCA requires that lists of channels be maintained for each base station. However, the criteria for deciding when a channel is free or occupied in CCA is based on LBT detection and interference distances, rather than the cell cluster structure. The cell cluster concept ensures that co-channel cells are separated by a fixed distance called the co-channel distance. By contrast, CCA exploits spectrum sensing and power control to achieve greater frequency reuse than DCA.

B. Numerical Results

Results comparing the three channel assignment schemes FCA, DCA, and CCA are presented in terms of the percentage of accepted customer connections, which is more commonly used than blocking probability in the evaluation of practical cellular systems. The percentage of accepted connections is one minus the blocking probability.

The simulated cellular service area consists of a 10×10 layout of hexagonal cells. The arrival of a call is assumed to be a Poisson process with a variable mean arrival rate expressed in calls/second and fixed mean call departure rate expressed in seconds. The ratio between the mean arrival rate and the mean call departure rate is the traffic intensity or traffic load. A two-tier cluster of hexagonal cells is assumed, such that the frequency reuse factor is 19, i.e., the cluster size is N=19. Other radio system parameters were used as described in the "Uplink Allocation" and "Downlink Allocation" sections, above.

Figure 20:
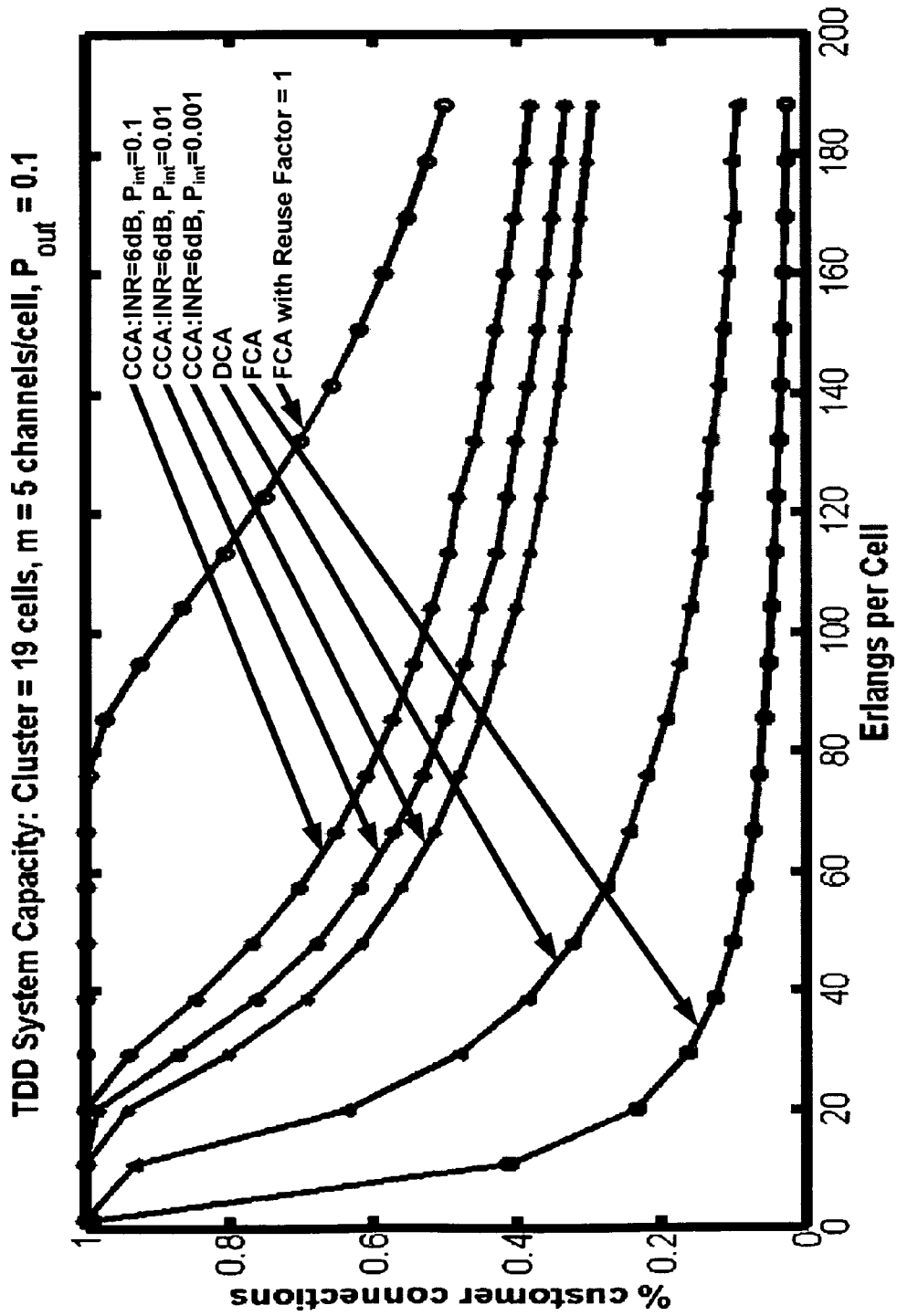
FIG. 20 shows simulated system capacity in terms of the simultaneous customer connections for an example system with 95 channels throughout a range of traffic intensity with an interference-to-noise ratio of 6 dB according to embodiments of the invention.

FIG. 20 shows the system capacity in terms of the simultaneous customer connections when 95 channels are available throughout a range of traffic intensity from 0 to 190 Erlangs/cell. In the figure, the curves marked with squares and triangles correspond to the FCA and DCA schemes, respectively. The FCA curve provides a lower bound on the performance of the DCA and CCA schemes, and is obtained using Equation (37). The three curves that marked as CCA in each figure show that the system capacity of CCA increases as the probability of interference increases. The DCA and CCA curves were obtained by computer simulation. Each simulation result was obtained by averaging over 10,000 trials. In each case, the 95% confidence intervals are less than 1% in width and are omitted from the figures for the sake of clarity. The curve marked with circles shows the performance of FCA with unit reuse factor, obtained using Equation (38). This curve provides an upper bound on the performance of the CCA scheme. The gap between the CCA curves and the upper bound curve suggests that there may be room for further capacity improvement.

Figure 21:
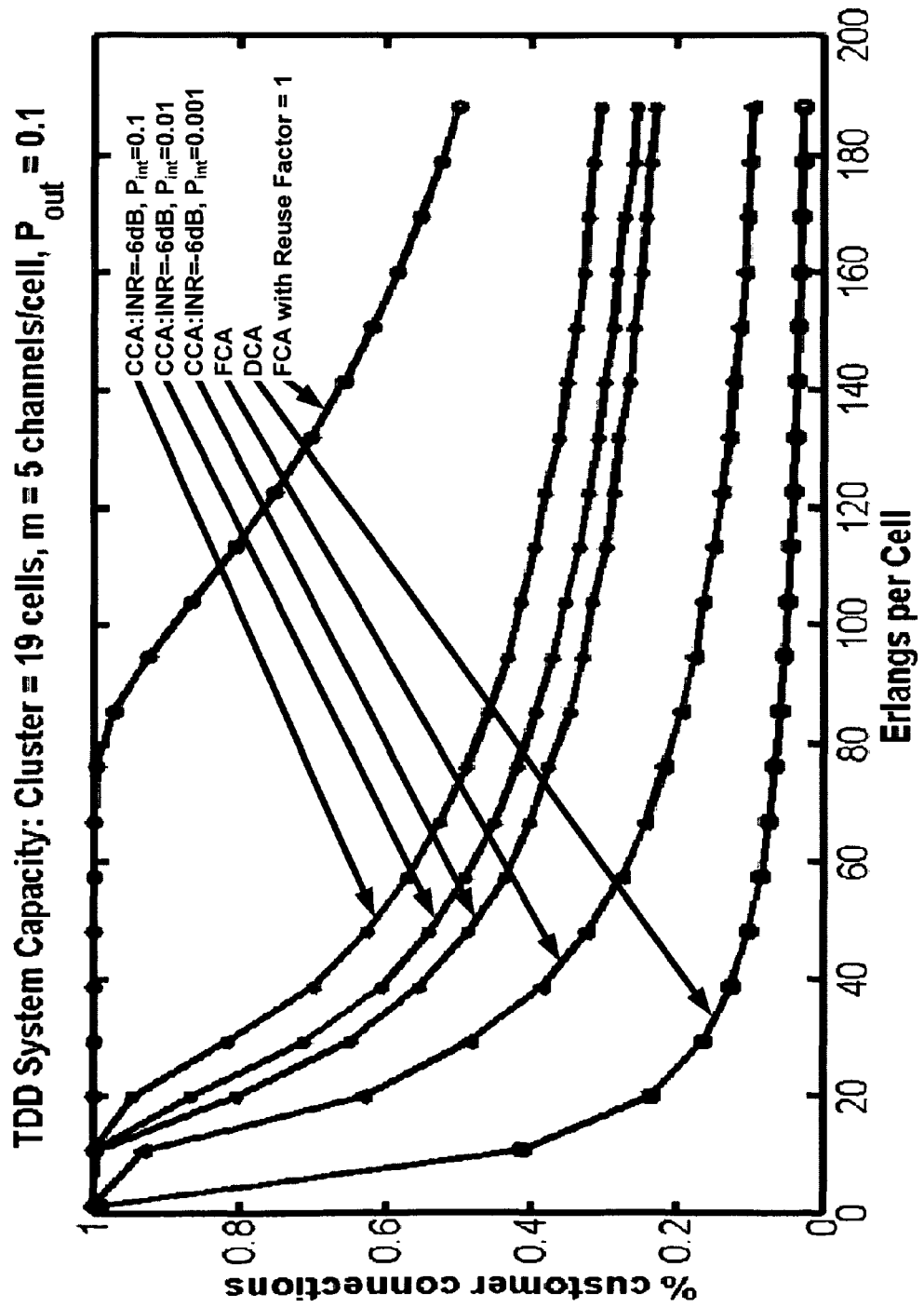
FIG. 21 shows simulated system capacity in terms of the simultaneous customer connections for an example system with 95 channels throughout a range of traffic intensity with an interference-to-noise ratio of −6 dB according to embodiments of the invention.
Figure 22:
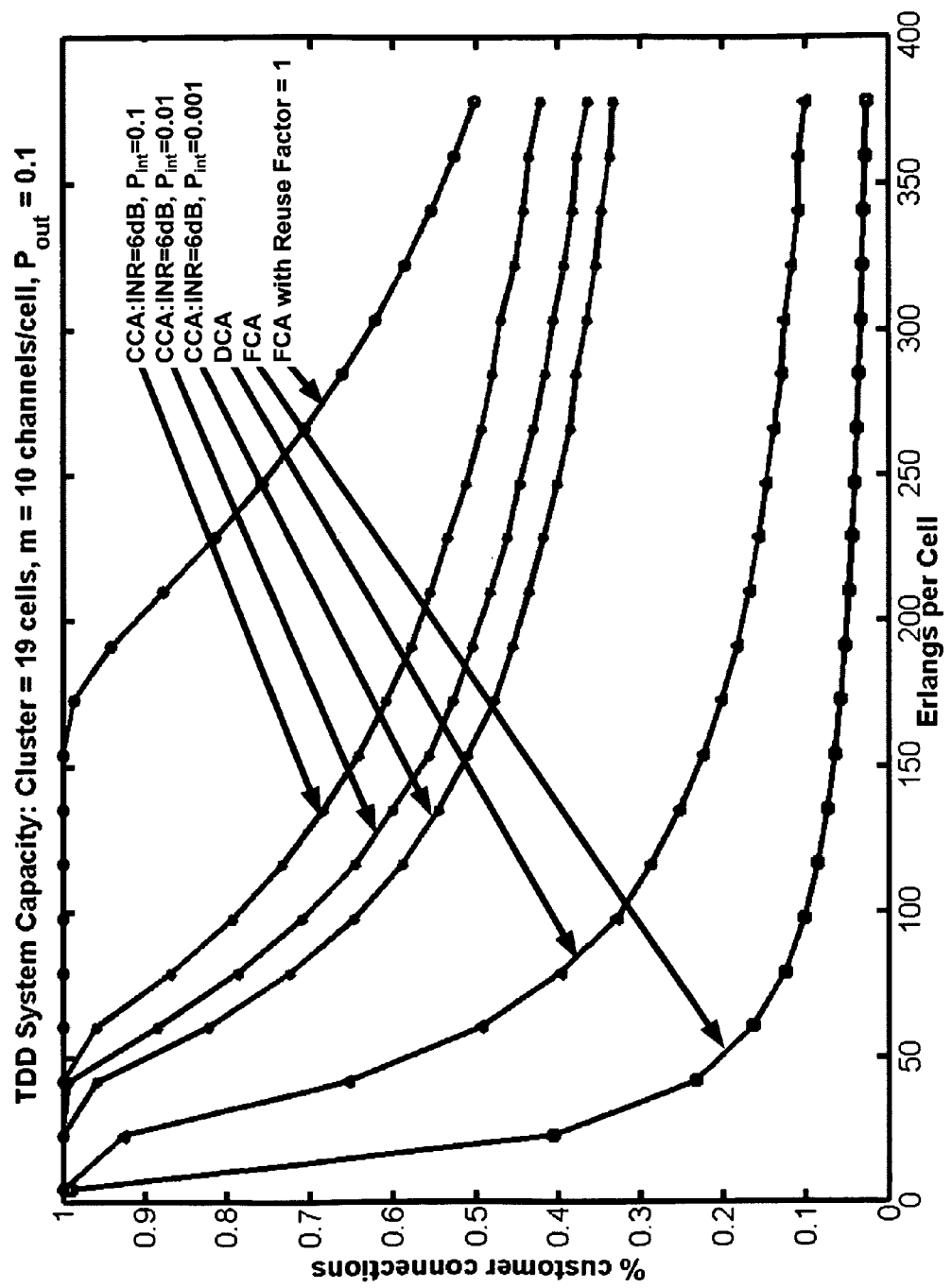
FIG. 22 shows simulated system capacity in terms of the simultaneous customer connections for an example system with 190 channels throughout a range of traffic intensity with an interference-to-noise ratio of 6 dB according to embodiments of the invention.
Figure 23:
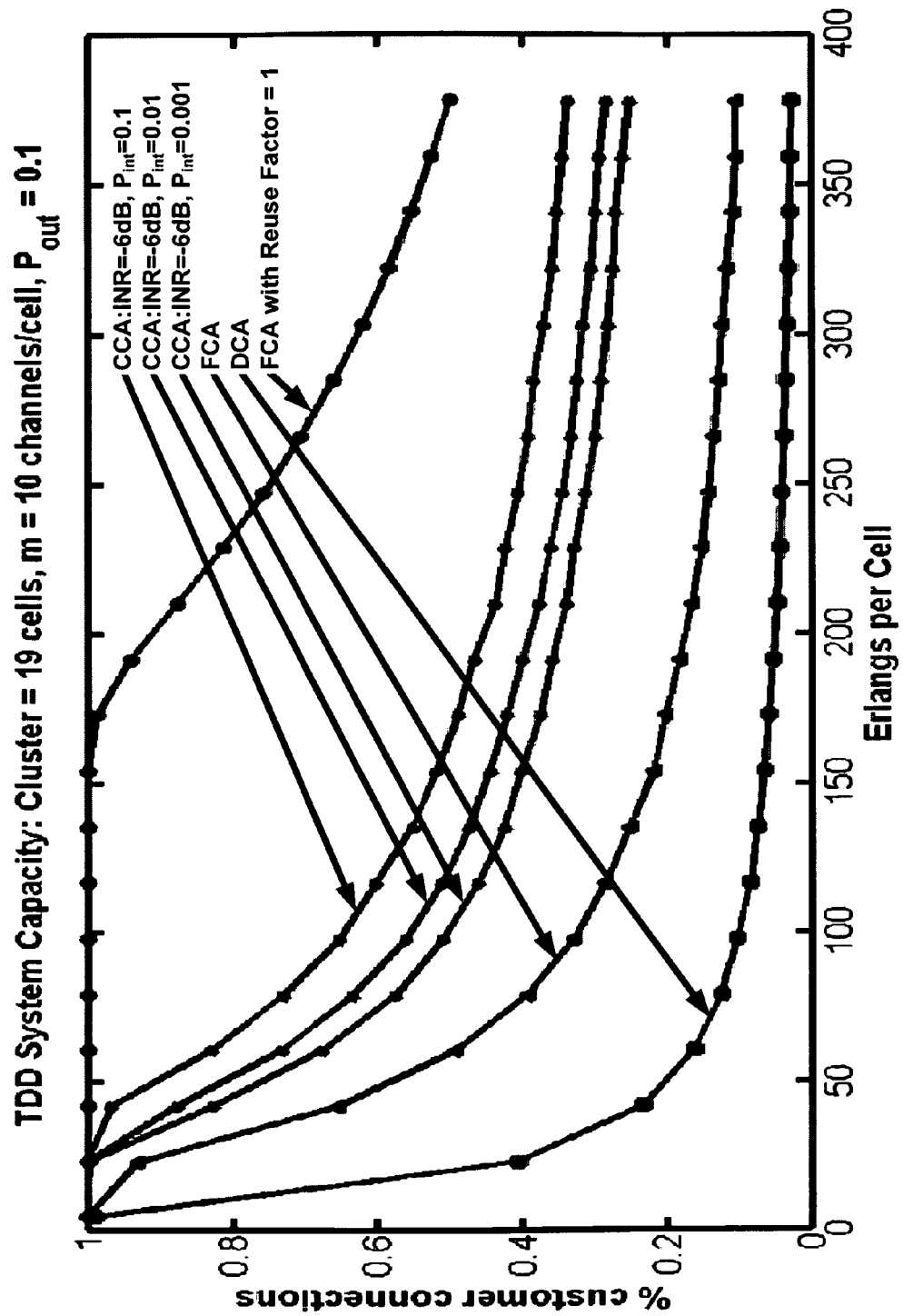
FIG. 23 shows simulated system capacity in terms of the simultaneous customer connections for an example system with 190 channels throughout a range of traffic intensity with an interference-to-noise ratio of −6 dB according to embodiments of the invention.

In FIG. 20, CCA can is shown to support increased traffic intensity with a factor of relative to 2 to 3 DCA such that more than 90% of the customer calls are simultaneously connected, as the probability of interference is varied from 0.001 to 0.1. The simulation results in FIG. 20 correspond to an Interference-to-Noise Ratio (INR) of 6 dB. FIG. 21 shows the system capacity when INR=−6 dB. In FIG. 21, it is shown that the CCA can support increased traffic intensity with a factor of 1.3 to 2 relative to DCA such that 90% of the customer calls are simultaneously connected, as the probability of interference is varied from 0.001 to 0.1. FIGS. 22 and 23 show that doubling the number of channels to 190, for INR=6 dB and INR=−6 dB, respectively, does not significantly change the relative performance of CCA vs. DCA.

Figure 24:
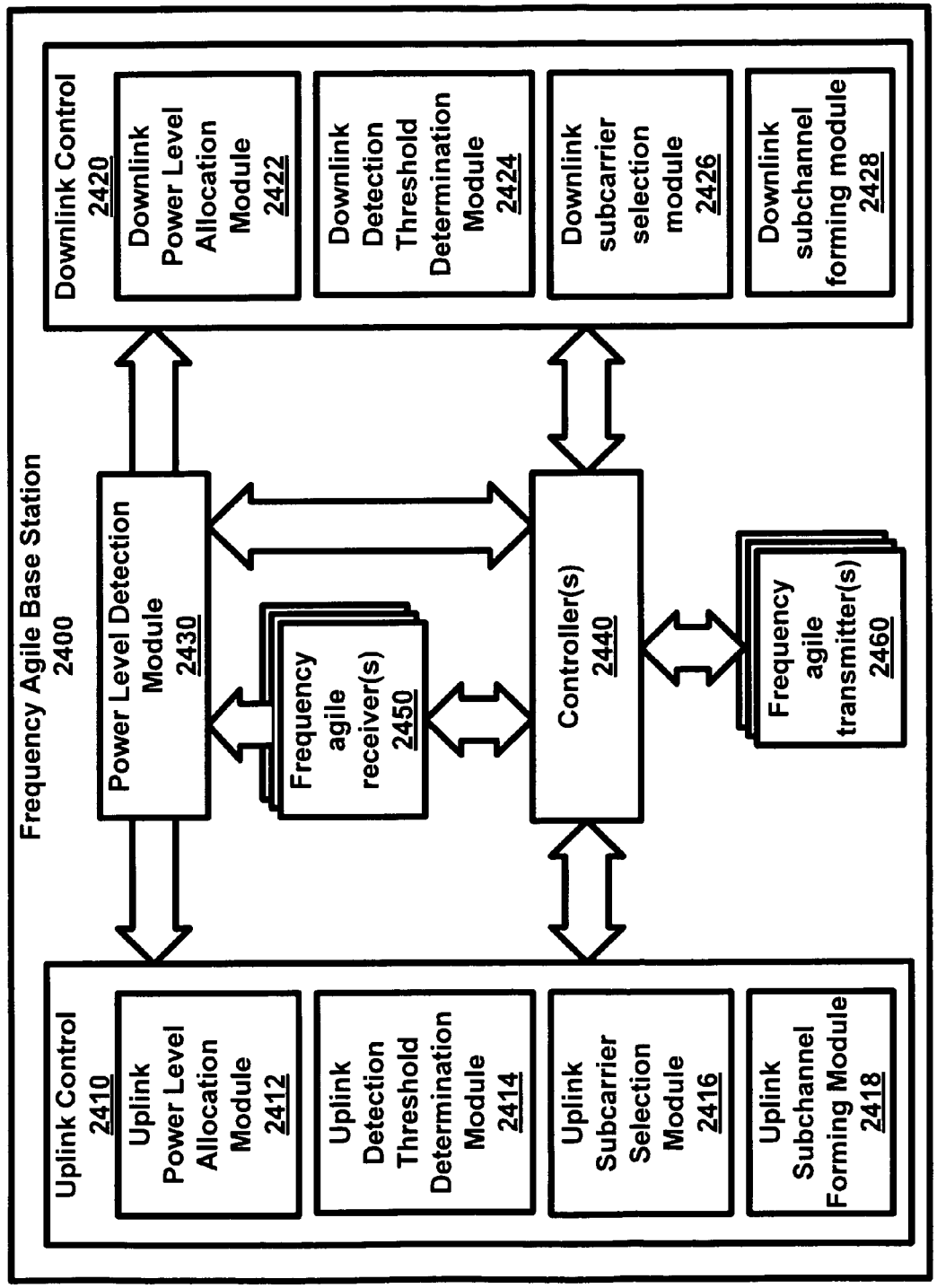
FIG. 24 is a block diagram of an example frequency agile base station according to an embodiment of the present invention.

FIG. 24 is a block diagram of an example frequency agile base station 2400 according to an embodiment of the present invention. As shown in this example, the frequency agile base station 2400 includes: frequency agile receiver(s), frequency agile transmitter(s) 2460, power level detection module(s) 2430, an uplink control section 2410, a downlink control section 2420 and controller(s) 2440. The frequency agile receiver(s) 2450 may be configured to receive communications from at least one frequency agile mobile station on at least one subcarrier in a set of subcarriers. The frequency agile transmitter(s) 2460 may be configured to transmit communications to at least one frequency agile mobile station on at least one subcarrier in the set of subcarriers. The power level detector module(s) 2430 may be configured to identify a received power level for at least one subcarrier in the set of subcarriers.

The uplink control section 2410 may include an uplink power level allocation module 2412, an uplink detection threshold determination module 2414, an uplink subcarrier selection module 2416 and an uplink subchannel forming module 2418. The uplink power level allocation module 2412 may be configured to allocate a minimum uplink power level needed to establish uplink communications from one of the agile mobile station(s) to the frequency agile base station 2400. The uplink detection threshold determination module 2414 may be configured to determine an uplink detection threshold using the minimum uplink power level where the uplink detection threshold is set to avoid interference with other devices currently transmitting on at least one subcarrier in the set of subcarriers. The uplink subcarrier selection module 2416 may be configured to select an uplink subset of subcarriers not already assigned where each subcarrier in the uplink subset of subcarriers has a received power level that is less than the uplink detection threshold. The uplink subchannel forming module 2418 may be configured to form an uplink subchannel that satisfies an uplink bandwidth requirement where the uplink subchannel consist of selected subcarriers in the set of subcarriers available for uplink data transmission from the frequency agile mobile station to the frequency agile base station 2400.

The downlink control section 2420 may include a downlink power level allocation module 2422, a downlink detection threshold determination module 2424, a downlink subcarrier selection module 2426 and a downlink subchannel forming module 2428. The downlink power level allocation module 2422 may be configured to allocate a minimum downlink power level needed to establish downlink communications from the frequency agile base station 2400 to at least one of the agile mobile station(s). The downlink detection threshold determination module 2424 may be configured to determine a downlink detection threshold using the minimum downlink power level where the downlink detection threshold is set to avoid interference with other devices currently transmitting on at least one subcarrier in the set of subcarriers. The downlink subcarrier selection module 2426 may be configured to select a downlink subset of subcarriers not already assigned where each subcarrier in the downlink subset of subcarriers has a received power level that is less than the downlink detection threshold. The downlink subchannel forming module 2428 may be configured to form a downlink subchannel that satisfies a downlink bandwidth requirement where the downlink subchannel consists of selected subcarriers in the set of subcarriers available for downlink data transmission between the frequency agile base station 2400 and at least one of the agile mobile station(s).

Figure 25:
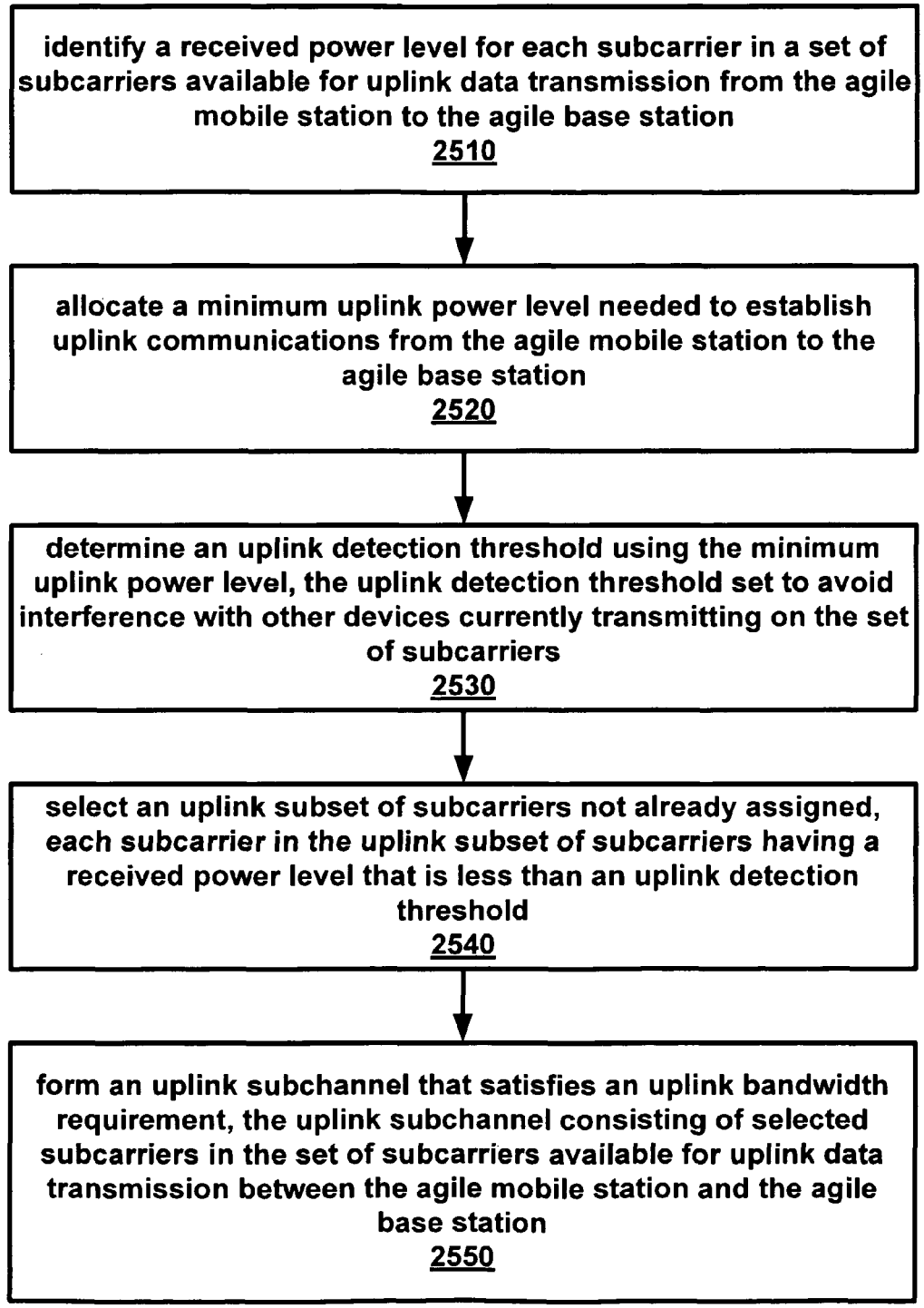
FIG. 25 is a flow diagram of an example method for assigning uplink subchannel(s) according to an embodiment of the present invention.

FIG. 25 is a flow diagram of an example method for assigning uplink subchannel(s) for uplink communication from a frequency agile mobile station to an frequency agile base station according to an embodiment of the present invention. At 2510, a received power level may be identified for each subcarrier in a set of subcarriers available for uplink data transmission from the frequency agile mobile station to the frequency agile base station. In some embodiments, the received power level may be detected by the frequency agile base station. In yet other embodiments, received power level(s) may be detected by one or more agile mobile station(s).

A minimum uplink power level needed to establish uplink communications from the frequency agile mobile station to the frequency agile base station may be allocated at 2520. An uplink detection threshold may be determined using the minimum uplink power level at 2530 where the uplink detection threshold is set to avoid interference with other devices currently transmitting on the set of subcarriers. The determination of the uplink detection threshold may also use at least one of the following: a base station maximum transmit power; a signal propagation path loss function; a minimum received signal threshold ($r_{min}$); a maximum interference threshold ($i_{max}$); and/or any combination of the above. The determination of the uplink detection threshold may also use at least one of the following: a variance of shadowing noise between the frequency agile mobile station and the frequency agile base station; a variance of shadowing noise between the frequency agile mobile station and other devices; an outage probability threshold of a victim station; interference probability threshold of a victim station; and detector sensitivity of the frequency agile base station. The signal propagation path loss function may use an Erceg model.

At 2540, an uplink subset of subcarriers not already assigned may be selected where each subcarrier in the uplink subset of subcarriers has a received power level that is less than an uplink detection threshold. An uplink subchannel that satisfies an uplink bandwidth requirement may be formed at 2550 where the uplink subchannel consists of selected subcarriers in the set of subcarriers available for uplink data transmission between the frequency agile mobile station and the frequency agile base station.

The agile mobile station(s) and the frequency agile base station(s) may be configured to operate in a WiMAX wireless network, in a wireless network that uses orthogonal frequency division multiple access or other type of network that uses multiple narrowband frequency channels to communicate.

Figure 26:
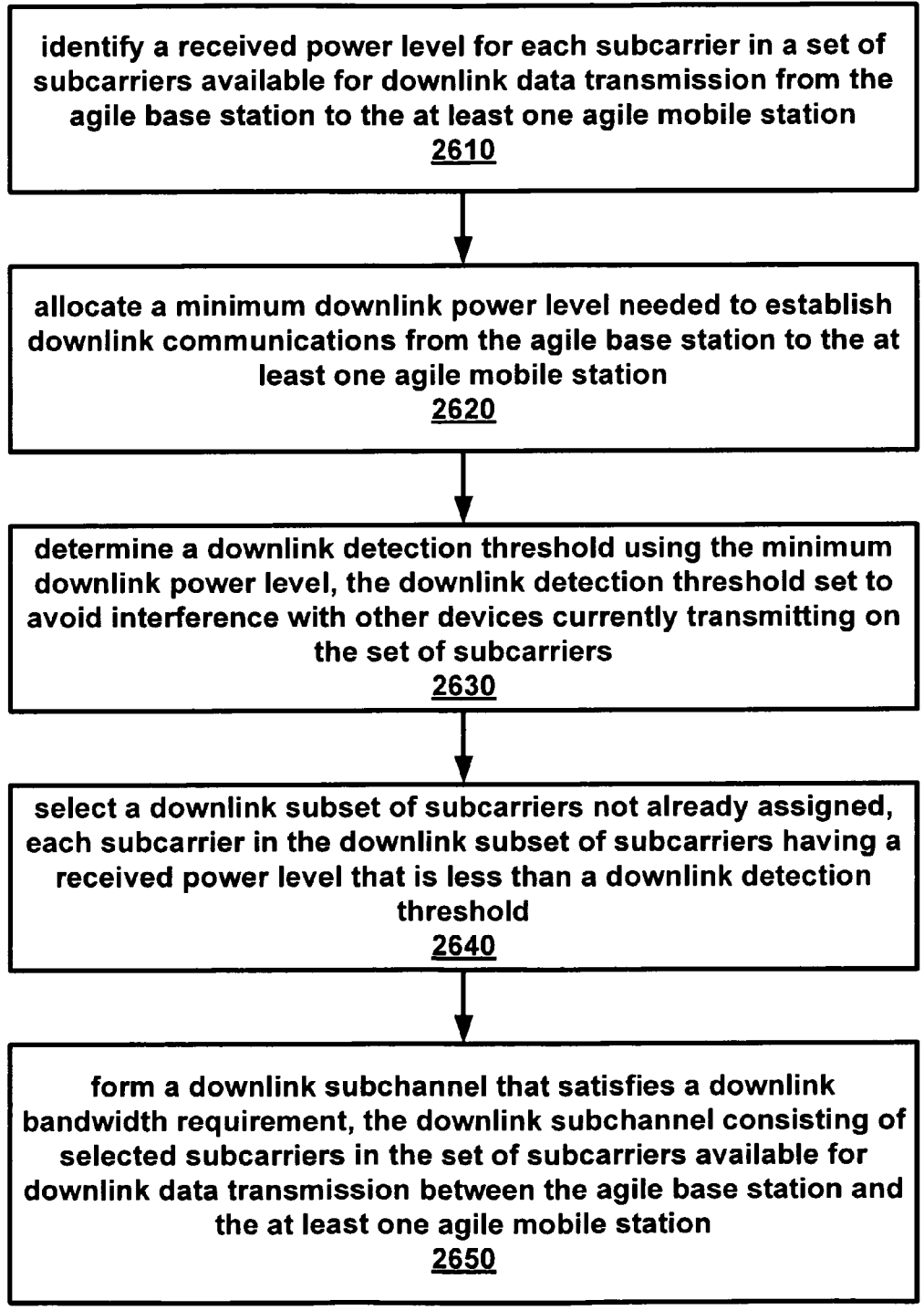
FIG. 26 is a flow diagram of an example method for assigning downlink subchannel(s) according to an embodiment of the present invention.

FIG. 26 is a flow diagram of an example method for assigning downlink subchannel(s) from a frequency agile base station to at least one frequency agile mobile station. A received power level for each subcarrier in a set of subcarriers available for downlink data transmission from the frequency agile base station to the at least one agile mobile station is identified at 2610. A minimum downlink power level needed to establish downlink communications from the frequency agile base station to the agile mobile station(s) may be allocated at 2620. At 2630, a downlink detection threshold using the minimum downlink power level is determined so that the downlink detection threshold avoids interference with other devices currently transmitting on the set of subcarriers. A downlink subset of subcarriers not already assigned may be selected at 2640 such that subcarrier(s) in the downlink subset of subcarriers have a received power level that is less than a downlink detection threshold. At 2650, a downlink subchannel may be formed that satisfies a downlink bandwidth requirement that consists of selected subcarriers in the set of subcarriers available for downlink data transmission between the frequency agile base station and the agile mobile station(s).

Embodiments of the cognitive WiMAX architecture described herein may employ frequency-agile radio techniques. It is believed that more sophisticated CCA schemes that involve collaborative sensing among base stations and subscriber stations may be used. Employing cognitive radio technology in the mobile stations may enable spectrum sensing on an uplink channel with realizable detectors, provided a suitable mobile station to mobile station propagation model is available. The introduction of cognitive radio technology in a mobile station may allow the possibility of multi-hop packet forwarding, which could further increase frequency reuse in the network at the expense of higher cost on the mobile station side.

Examples provided herein are merely illustrative and are not meant to be an exhaustive list of all possible embodiments, applications, or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the relevant arts or fields are intended to be within the scope of the appended claims.

The disclosures of all references and publications cited above are expressly incorporated by reference in their entireties to the same extent as if each was incorporated by reference individually.

Coverage, Detection, and Interference Distances

The signal strength received at node v from node p is given by $$R_v = s_p - g(d_{p,v}) + W_{p,v}, \quad (39)$$

where $W_{p,v} \sim N(0, \sigma_{p,v}^2)$ we have $$\begin{aligned} P_{out} &= P\{s_p - g(d_{p,v}) + W_{p,v} < r_{min} \mid E_p\} \\ &= P\{W_{p,v} < r_{min} - s_p + g(d_{p,v}) \mid E_p\} \\ &= 1 - Q\left(\frac{r_{min} - s_p + g(d_{p,v})}{\sigma_{p,v}}\right). \end{aligned} \quad (40)$$

By rearranging terms in (40), we obtain $$d_{p,v}=g^{-1}(s_p-r_{min}+\sigma_{p,v}Q^{-1}(1-P_{out})). \quad (41)$$

Assuming that $P_{out}$ is a continuous function of $d_{p,v}$, the definition of $d_{cov,p}$ in (6) implies that $d_{p,v}=d_{cov,p}$ when $P_{out}=\epsilon_{out}$, from which (7) follows:

$$d_{cov,p}=g^{-1}(s_p-r_{min}+\sigma_{p,v}Q^{-1}(1-\epsilon_{out})).$$

The signal strength received at node a from node p is given by $$R_a=s_a-g(d_{p,a})+W_{p,a}, \quad (42)$$

where $W_{p,v} \sim N(0, \sigma_{p,a}^2)$. From (9), we have $$\begin{aligned}P_{det} &= P\{s_a - g(d_{p,a}) + W_{p,a} \geq \eta_{det}\} \\ &= P\{W_{p,a} \geq \eta_{det} - s_p + g(d_{p,a})\} \\ &= Q\left(\frac{\eta_{det} - s_p + g(d_{p,a})}{\sigma_{p,a}}\right).\end{aligned} \quad (43)$$

The definition of $d_{det}$ in (10) implies that $d_{p,a}=d_{det}$ when $P_{det}=\epsilon_{det}$, from which (11) follows:

$$d_{det}=g^{-1}(s_p-\eta_{det}-\sigma_{p,a}Q^{-1}(1-\epsilon_{det})).$$

From (14), we have $$P_{int}=P\{I_v \geq i_{max}|E_a\}P(E_a) \cdot P\{R_v \geq r_{min}|E_p\}P(E_p). \quad (44)$$

We have $$P\{I_v \geq i_{max} | E_a\} = Q\left(\frac{i_{max} + g(d_{a,v}) - s_a}{\sigma_{a,v}}\right) \quad (45)$$

$$P\{R_v \geq r_{min} | E_p\} = 1 - P_{out}. \quad (46)$$

Assuming that the primary node p is always in the on state, the probability that node a is in the on state can be approximated as $P(E_a) \approx 1-P_{det}$, assuming that the node a always has data to send. Hence, (44) can be written as $$P_{int}(1 - P_{out})(1 - P_{det})Q\left(\frac{i_{max} + g(d_{a,v}) - s_a}{\sigma_{a,v}}\right). \quad (47)$$

Assuming that $P_{int}$ is a continuous function of $d_{a,v}$, the definition of $d_{cov,p}$ in (15) implies that $d_{a,v}=d_{int}$ when $P_{int}=\epsilon_{int}$, we obtain (16) follows:

$$d_{int}=g^{-1}(s_a-i_{max}-\alpha_{a,v}),$$

where $$\alpha_{a,v} = -\sigma_{a,v}Q^{-1}\left(\frac{\epsilon_{int}}{(1 - P_{out})(1 - P_{det})}\right).$$

Using the identity $Q^{-1}(x) \equiv -Q^{-1}(1-x)$, we obtain (17).

Optimum LBT Detection

Replacing the terms in (19) with their mathematical formulas, as described herein, we obtain the following inequality:

$$g^{-1}(s_p-\eta+\alpha_{p,a}) \geq g^{-1}(s_a-i_{max}-\alpha_{a,v})+g^{-1}(s_p-r_{min}+\alpha_{p,v}). \quad (48)$$

From (48), we determine that the LBT detection threshold must satisfy the following inequality:

$$\eta \leq (s_p-\alpha_{p,a}-g(g^{-1}(s_a-i_{max}+\alpha_{a,v})+g^{-1}(s_p-r_{min}+a_{p,v})). \quad (49)$$

In particular, if we ignore the shadowing components, the LBT detection threshold satisfies $$\eta \leq s_p g(g^{-1}(s_a-i_{max})+g^{-1}(s_p-r_{min})). \quad (50)$$

It is understood that the invention is not limited to the particular methodology, protocols, topologies, etc., as described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise.

Unless defined otherwise, all technical and scientific terms used herein have the same meanings as commonly understood by one of ordinary skill in the art to which the invention pertains. The embodiments of the invention and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein.

Any numerical values recited herein include all values from the lower value to the upper value in increments of one unit provided that there is a separation of at least two units between any lower value and any higher value. As an example, if it is stated that the concentration of a component or value of a process variable such as, for example, size, angle size, pressure, time and the like, is, for example, from 1 to 90, specifically from 20 to 80, more specifically from 30 to 70, it is intended that values such as 15 to 85, 22 to 68, 43 to 51, 30 to 32 etc., are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Particular methods, devices, and materials are described, although any methods and materials similar or equivalent to those described herein can be used in the practice or testing of the invention. All references referred to herein are incorporated by reference herein in their entirety.

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) that operate in a WiMAX network. However, one skilled in the art will recognize that embodiments of the invention could be operated in many different types of networks that provide multiple frequencies for communications.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A frequency agile base station comprising:
   at least one frequency agile receiver configured to receive communications from at least one frequency agile mobile station on at least one subcarrier in a set of subcarriers;
   at least one frequency agile transmitter configured to transmit communications to at least one frequency agile mobile station on at least one subcarrier in the set of subcarriers;
   a power level detector configured to identify a received power level for at least one subcarrier in the set of subcarriers;
   an uplink power level allocation module configured to allocate a minimum uplink power level needed to establish uplink communications from one of the at least one frequency agile mobile station to the frequency agile base station;
   an uplink detection threshold determination module configured to determine an uplink detection threshold using the minimum uplink power level, the uplink detection threshold set to avoid interference with other devices currently transmitting on at least one subcarrier in the set of subcarriers;
   an uplink subcarrier selection module configured to select an uplink subset of subcarriers not already assigned, each subcarrier in the uplink subset of subcarriers having a received power level that is less than the uplink detection threshold;
   an uplink subchannel forming module configured to form an uplink subchannel that satisfies an uplink bandwidth requirement, the uplink subchannel consisting of selected subcarriers in the set of subcarriers available for uplink data transmission from the frequency agile mobile station to the frequency agile base station;
   a downlink power level allocation module configured to allocate a minimum downlink power level needed to establish downlink communications from the frequency agile base station to at least one of the at least one agile mobile station;
   a downlink detection threshold determination module configured to determine a downlink detection threshold using the minimum downlink power level, the downlink detection threshold set to avoid interference with other devices currently transmitting on at least one subcarrier in the set of subcarriers;
   a downlink subcarrier selection module configured to select a downlink subset of subcarriers not already assigned, each subcarrier in the downlink subset of subcarriers having a received power level that is less than the downlink detection threshold; and
   a downlink subchannel forming module configured to a downlink subchannel that satisfies a downlink bandwidth requirement, the downlink subchannel consisting of selected subcarriers in the set of subcarriers available for downlink data transmission between the frequency agile base station and at least one of the at least one agile mobile station.

2. The frequency agile base station according to claim 1, wherein the uplink detection threshold determination module uses at least one of the following:
   a base station maximum transmit power;
   a signal propagation path loss function;
   a minimum received signal threshold;
   a minimum uplink power level; or
   a maximum interference threshold; or
   any combination of the above.

3. The frequency agile base station according to claim 1, wherein the uplink detection threshold determination module uses a signal propagation path loss function.

4. The frequency agile base station according to claim 1, wherein the uplink detection threshold determination module also uses at least one of the following:
   a variance of shadowing noise between the frequency agile mobile station and the frequency agile base station;
   a variance of shadowing noise between the frequency agile mobile station and other devices;
   an outage probability threshold of a victim station;
   interference probability threshold of a victim station; and
   detector sensitivity of the frequency agile base station.

5. The frequency agile base station according to claim 1, wherein the frequency agile base station is configured to operate in a WiMAX wireless network.

6. The frequency agile base station according to claim 1, wherein the frequency agile mobile station and the frequency agile base station are configured to operate in a wireless network that uses orthogonal frequency division multiple access.

7. The frequency agile base station according to claim 1, wherein the downlink detection threshold determination module uses at least one of the following:
 a base station maximum transmit power;
 a signal propagation path loss function;
 a minimum downlink power level;
 a minimum received signal threshold; or
 a maximum interference threshold; or
 any combination of the above.

8. The frequency agile base station according to claim 1, wherein the downlink detection threshold determination module uses a signal propagation path loss function.

9. The frequency agile base station according to claim 1, wherein the downlink detection threshold determination module also uses at least one of the following:
 a variance of shadowing noise between the frequency agile base station and the at least one agile mobile station;
 a variance of shadowing noise between the frequency agile base station and other devices;
 an outage probability threshold of a victim station;
 interference probability threshold of a victim station; and
 detector sensitivity of the frequency agile base station.

10. A method for assigning at least one channel for uplink communication from a frequency agile mobile station to a frequency agile base station comprising:
 identifying a received power level for each subcarrier in a set of subcarriers available for uplink data transmission from the frequency agile mobile station to the frequency agile base station;
 allocating a minimum uplink power level needed to establish uplink communications from the frequency agile mobile station to the frequency agile base station;
 determining an uplink detection threshold using the minimum uplink power level, the uplink detection threshold set to avoid interference with other devices currently transmitting on the set of subcarriers;
 selecting an uplink subset of subcarriers not already assigned, each subcarrier in the uplink subset of subcarriers having a received power level that is less than an uplink detection threshold; and
 forming an uplink subchannel that satisfies an uplink bandwidth requirement, the uplink subchannel consisting of selected subcarriers in the set of subcarriers available for uplink data transmission between the frequency agile mobile station and the frequency agile base station.

11. The method according to claim 10, wherein the determination of the uplink detection threshold also uses at least one of the following:
 a base station maximum transmit power;
 a signal propagation path loss function;
 a minimum uplink power level;
 a minimum received signal threshold; and
 a maximum interference threshold; and
 any combination of the above.

12. The method according to claim 10, wherein the determination of the uplink detection uses a signal propagation path loss function.

13. The method according to claim 10, wherein the determination of the uplink detection threshold also uses at least one of the following:
 a variance of shadowing noise between the frequency agile mobile station and the frequency agile base station;
 a variance of shadowing noise between the frequency agile mobile station and other devices;
 an outage probability threshold of a victim station;
 interference probability threshold of a victim station; and
 detector sensitivity of the frequency agile base station.

14. The method according to claim 10, wherein the received power level is detected by the frequency agile base station.

15. The method according to claim 10, wherein the frequency agile mobile station and the frequency agile base station are configured to operate in a wireless network that uses orthogonal frequency division multiple access.

16. A method for assigning at least one channel for downlink communication from a frequency agile base station to at least one frequency agile mobile station comprising:
 identifying a received power level for each subcarrier in a set of subcarriers available for downlink data transmission from the frequency agile base station to the at least one agile mobile station;
 allocating a minimum downlink power level needed to establish downlink communications from the frequency agile base station to the at least one agile mobile station;
 determine a downlink detection threshold using the minimum downlink power level, the downlink detection threshold set to avoid interference with other devices currently transmitting on the set of subcarriers;
 selecting a downlink subset of subcarriers not already assigned, each subcarrier in the downlink subset of subcarriers having a received power level that is less than a downlink detection threshold; and
 forming a downlink subchannel that satisfies a downlink bandwidth requirement, the downlink subchannel consisting of selected subcarriers in the set of subcarriers available for downlink data transmission between the frequency agile base station and the at least one agile mobile station.

17. The method according to claim 16, wherein the determination of the downlink detection threshold also uses at least one of the following:
 a base station maximum transmit power;
 a signal propagation path loss function;
 a minimum downlink power level;
 a minimum received signal threshold; and
 a maximum interference threshold; and
 any combination of the above.

18. The method according to claim 16, wherein the determination of the downlink detection uses a signal propagation path loss function.

19. The method according to claim 16, wherein the determination of the downlink detection threshold also uses at least one of the following:
 a variance of shadowing noise between the frequency agile base station and the at least one agile mobile station;
 a variance of shadowing noise between the frequency agile base station and other devices;
 an outage probability threshold of a victim station;
 interference probability threshold of a victim station; and
 detector sensitivity of the frequency agile base station.

20. The method according to claim 16, wherein the frequency agile mobile station and the frequency agile base station are configured to operate in a wireless network that uses orthogonal frequency division multiple access.

* * * * *